(12) United States Patent
Takaishi

(10) Patent No.: US 8,520,334 B2
(45) Date of Patent: Aug. 27, 2013

(54) DISK STORAGE DEVICE, CONTROLLER OF THE SAME, CONTROLLING METHOD PERFORMED BY THE SAME, AND ELECTRONIC DEVICE

(75) Inventor: Kazuhiko Takaishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 13/239,237

(22) Filed: Sep. 21, 2011

(65) Prior Publication Data

US 2012/0162805 A1 Jun. 28, 2012

(30) Foreign Application Priority Data

Dec. 24, 2010 (JP) ................................. 2010-288844

(51) Int. Cl.
*G11B 5/596* (2006.01)
*G11B 5/09* (2006.01)
(52) U.S. Cl.
USPC .................. 360/78.14; 360/78.06; 360/78.04; 360/77.02; 360/29; 360/51
(58) Field of Classification Search
None
See application file for complete search history.

(56) References Cited

U.S. PATENT DOCUMENTS

| 8,254,218 B2* | 8/2012 | Yang et al. | 369/44.11 |
| 2001/0021077 A1* | 9/2001 | Takaishi | 360/78.06 |

FOREIGN PATENT DOCUMENTS

| JP | 04-157678 | 5/1992 |
| JP | 07-078432 | 3/1995 |
| JP | 2001-256741 | 9/2001 |
| JP | 2003-338145 | 11/2003 |
| JP | 2006-294092 | 10/2006 |
| JP | 2008-159225 | 7/2008 |
| JP | 2008-243262 | 10/2008 |

OTHER PUBLICATIONS

Japanese Office Action dated Apr. 13, 2012, filed in Japanese counterpart Application No. 2010-288844, 7 pages (including English translation).

\* cited by examiner

*Primary Examiner* — Andrew L Sniezek
(74) *Attorney, Agent, or Firm* — Patterson & Sheridan LLP

(57) ABSTRACT

According to one embodiment, a disk storage device includes: a disk on which a servo pattern is recorded; a head; a driver; a signal generator; a demodulator; and a controller. Position signals for detecting an offset position from a center of a track are recorded in a recording area of a servo pattern. The signal generator generates a first timing signal indicating a timing for reading the position signals. When the controller performs a seek operation for moving the head to a target track, the signal generator generates a second timing signal. The period of the second timing signal for reading each of the position signals is made shorter than that of the first timing signal. A center time of the period of the second timing signal is shifted closer to a demodulation center time corresponding to a center of the recording area than that of the first timing signal.

18 Claims, 21 Drawing Sheets

Prior Art

Prior Art

Prior Art

Prior Art

Prior Art

Prior Art

Prior Art

Prior Art

DISK STORAGE DEVICE, CONTROLLER OF THE SAME, CONTROLLING METHOD PERFORMED BY THE SAME, AND ELECTRONIC DEVICE

CROSS-REFERENCE TO RELATED APPLICATIONS

This application is based upon and claims the benefit of priority from Japanese Patent Application No. 2010-288844, filed Dec. 24, 2010, the entire contents of which are incorporated herein by reference.

FIELD

Embodiments described herein relate generally to a disk storage device that performs a seek operation, a controller of the same, a controlling method performed by the same, and an electronic device.

BACKGROUND

Conventionally, disk storage devices using a head for read and write operations on a disk or the like, in a seek operation for moving the head to a target track on the disk, detect a servo pattern on which a plurality of position signals for detecting an offset position with respect to the center of the track are recorded to demodulate the position of the head. The demodulated position (decoded position) is used for control, thereby improving the response performance in the seek operation.

The position signals recorded on the servo pattern are used for obtaining an accurate decoded position during a following operation in which the head follows the track, and the position signals are not recorded thereon in consideration of the case where the head traverses the servo pattern obliquely. Therefore, in the seek operation, when a decoded position is obtained by detecting the position signals recorded on the servo pattern, an error of the decoded position increases in accordance with an increase in the velocity of the head moving in the radial direction of the disk. As a result, the velocity of the head reaches velocity (demodulation limit velocity) at which the correspondence relationship between the decoded position and the real position is obscure. The restriction by the demodulation limit velocity is one of the factors for preventing the response performance in the seek operation from being further improved.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment of the invention, a disk storage device, comprises: a disk on which a servo pattern is recorded; a head; a driver; a signal generator; a demodulator; and a controller. The servo pattern comprises a recording area for each track. A plurality of position signals for detecting an offset position from a center of the track is recorded in the recording area. The head is configured to read data recorded on the disk which is being rotated. The driver is configured to drive the head in a radial direction of the disk. The signal generator is configured to generate a first timing signal indicating a timing for reading the position signals from the read data. The demodulator is configured to demodulate a position of the head based on the position signals read in accordance with the generated first timing signal. The controller is configured to control the driver by referring to the demodulated position of the head. When the controller performs a seek operation for moving the head to a target track, the signal generator is configured to generate a second timing signal. A period of the second timing signal for reading each of the position signals is made shorter than that of the first timing signal. The center time of the period of the second timing signal is shifted closer to a demodulation center time corresponding to a center of the recording area than that of the first timing signal.

A disk storage device, a controller of the same, a controlling method performed by the same, and an electronic device according to an embodiment are described below in greater detail with reference to the accompanying drawings. To explain the embodiment, a disk storage device using a magnetic head for read and write operations on a magnetic disk is used as an example. It goes without saying that the disk storage device may be an optical disk device using a digital versatile disc (DVD), a magneto-optic (MO) disc or the like, or a read-only device (reproducing device).

Figure 1:
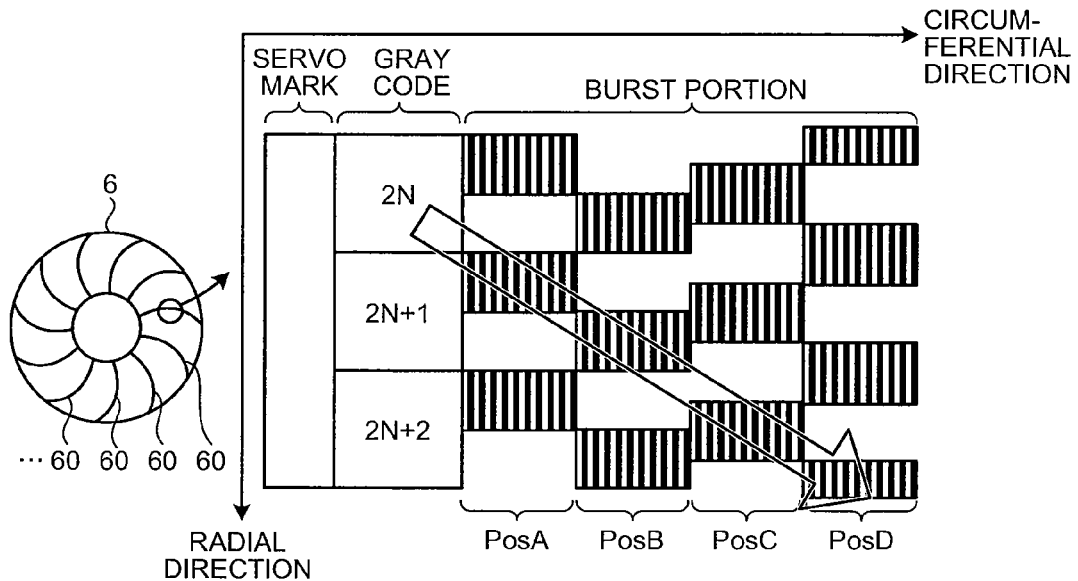
FIG. 1 is an exemplary conceptual diagram of a servo pattern recorded on a disk according to an embodiment.

The disk 6 will now be described in detail. FIG. 1 is an exemplary conceptual diagram of an example of the servo pattern 60 recorded on the disk 6. As illustrated in FIG. 1, the servo pattern 60 extending in arc in the radial direction from the center of rotation is recorded on the disk 6 on which the disk storage device performs read and write operations. The servo pattern 60 is information used for positioning the magnetic head.

The disk 6 is a storage medium obtained by forming a magnetic film on a disk-shaped substrate made of metal or glass. When data is recorded on the disk 6, the magnetic head applies a magnetic field on a recording area in which the data is to be recorded on the disk 6 to change the magnetization of the magnetic material on the surface, thereby recording the data. When data is read and reproduced from the disk 6, the magnetic head is moved to the recording area from which the data is to be reproduced on the disk 6 to read the magnetization of the magnetic material on the disk 6, thereby reproducing the data. The recording method of the disk 6 may be the perpendicular magnetic recording or the longitudinal magnetic recording.

The servo pattern 60 is configured to comprise a servo mark, a Gray code, and a burst portion. The servo mark is a reference mark that indicates the beginning of the servo pattern 60 and serves as a reference for reading. The Gray code records therein a track number for each track ("2N", "2N+1", "2N+2" . . . ) as digital data. In the disk storage device, the track number recorded in the Gray code is demodulated, making it possible to detect what track number the magnetic head is positioned. The burst portion is a recording area in which position signals PosA, PosB, PosC, and PosD indicating an area pattern of four phases shifted by 90 degrees are recorded so as to detect an offset position with respect to the center of the track in each track. In the disk storage device, the amplitude (corresponding to the area) of the position signals PosA, PosB, PosC, and PosD recorded in the burst portion is obtained to demodulate the position (offset position) of the magnetic head with respect to the center of the track of the track number thus detected.

Figure 2:
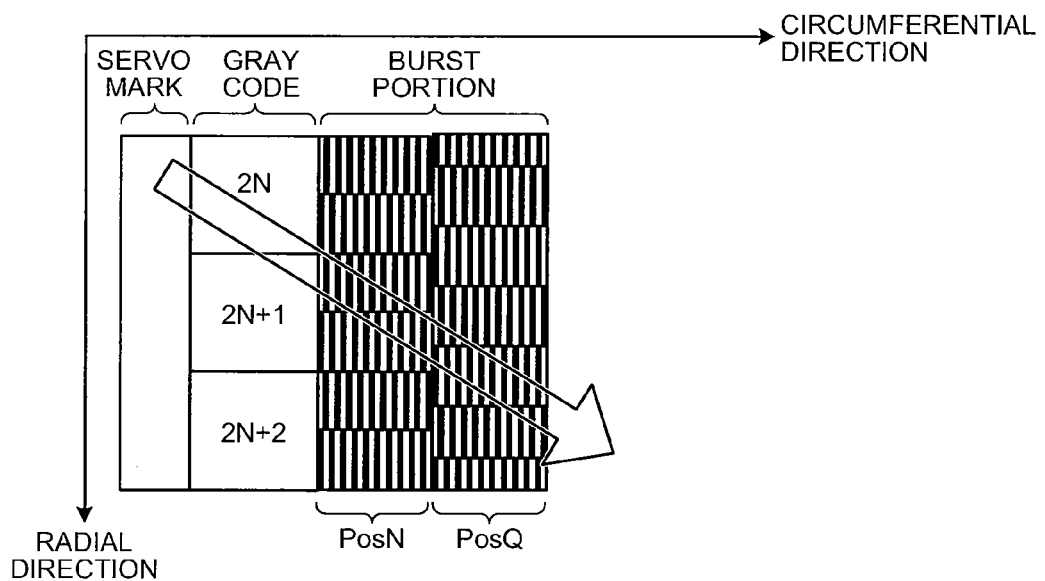
FIG. 2 is another exemplary conceptual diagram a servo pattern recorded on the disk in the embodiment.
Figure 3A:
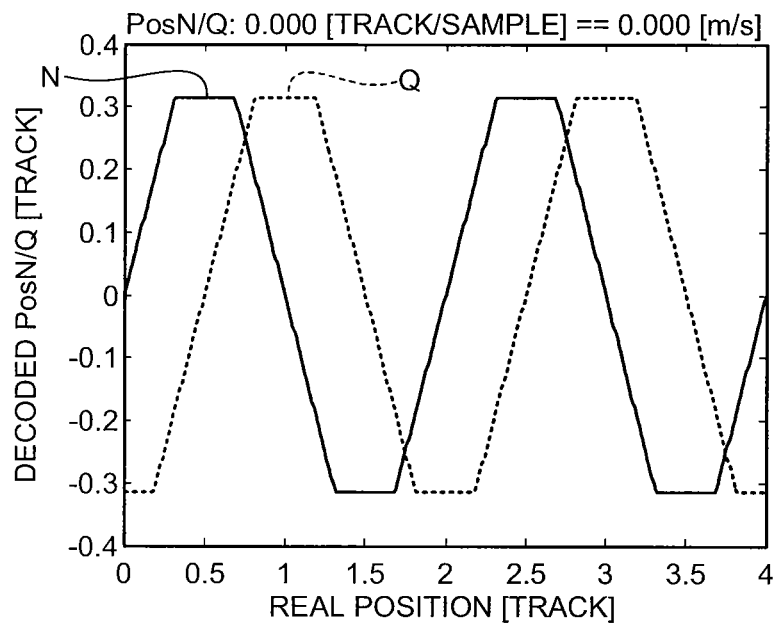
FIG. 3A is an exemplary graph of PosN and PosQ with respect to a real position of a magnetic head in a simulation result of a conventional disk storage device.
Figure 3B:
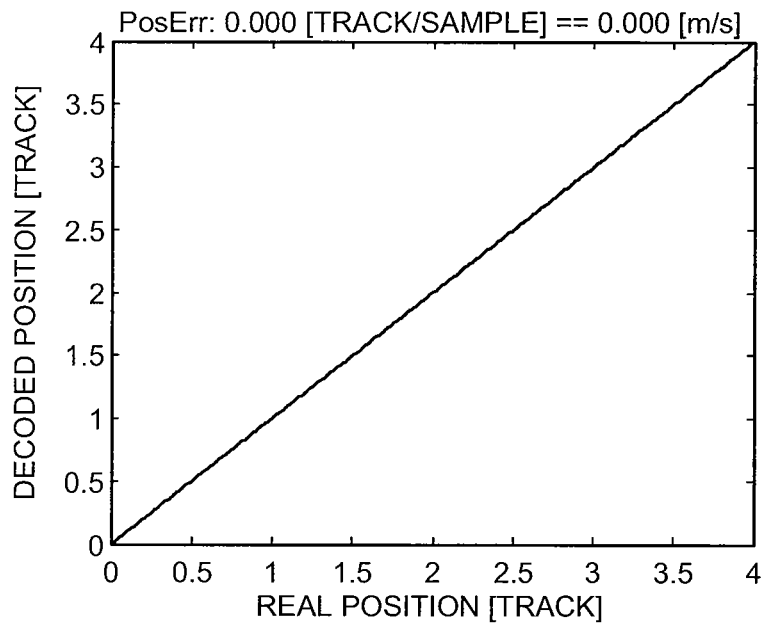
FIG. 3B is an exemplary graph of the real position and a decoded position of the magnetic head in the simulation result of the conventional disk storage device.

FIG. 2 is another exemplary conceptual diagram of an example of the servo pattern 60 recorded on the disk 6. More specifically, FIG. 2 is an exemplary diagram illustrating the case where a NULL pattern of two phases is formed in the burst portion of the servo pattern 60. As illustrated in FIG. 2, in the case of the NULL pattern, position signals PosN and PosQ of two phases shifted with respect to each other by 180 degrees are recorded in the burst portion. While the NULL pattern is similar to the pattern illustrated in FIG. 1, the width of the burst portion thereof can be made half of that of the pattern illustrated in FIG. 3. In the disk storage device, the amplitude (corresponding to the area) of the position signals PosN and PosQ recorded in the burst portion and change in the phases are obtained to demodulate the position (offset position) of the magnetic head with respect to the center of the track of the track number thus detected. It goes without saying that a DC pattern having a shape similar to that of the NULL pattern is processed in the same manner, which is not particularly illustrated.

Demodulation of the position of the magnetic head with the position signals PosA, PosB, PosC, and PosD will now be described. First, the position signals PosA, PosB, PosC, and PosD are obtained to calculate PosN and PosQ by Equations (1) and (2), respectively. In the case of the NULL pattern, because the position signals PosN and PosQ correspond to the results of Equations (1) and (2), the calculation can be omitted.

$$PosN = PosA - PosB \qquad (1)$$

$$PosQ = PosC - PosD \qquad (2)$$

A linear portion of the position signals is used to obtain a decoded position (current position of the magnetic head). The decoded position is obtained by calculation. For example, the decoded position (Position) is calculated by Equation blow (e.g., Japanese Patent Application (KOKAI) No. H8-195044 (KOKAI)). In other words, an absolute value abs (PosN) of PosN is compared with an absolute value abs(PosQ) of PosQ, and if abs (PosN)≦abs(PosQ) is satisfied, the decoded position is obtained by Equation (3).

$$\text{Position} = -\text{sgn}(PosQ) \ast PosN + \text{Track} \qquad (3)$$

If sgn(PosQ)*even(Track)>0.0 is satisfied, Equation (4) is added to Equation (3).

$$\text{Position} += \text{sgn}(PosQ) \ast \text{sgn}(PosN) \ast 1.0 \qquad (4)$$

On the contrary, if abs(PosN)≦abs(PosQ) is not satisfied, Equation (5) is used.

$$\text{Position} = \text{sgn}(PosN) \ast (PosQ + \text{even}(\text{Track}) \ast 0.5) + \text{Track} \qquad (5)$$

sgn( ) represents the sign of ( ), Track represents the track number, and "1" is assigned to even(Track) when the track number is an even number, whereas "0" is assigned thereto when the track number is an odd number. If this is written in C program, it is described as follows:

```
if(abs(PosN)≦abs(PosQ)){
Position=-sgn(PosQ)*PosN+Track;
if(sgn(PosQ)*even(Track)>0.0)
Position+=sgn(PosQ)*sgn(PosN)*1.0;
}else{
Position=sgn(PosN)*(PosQ+even(Track)*0.5)+Track;
```

To examine the relationship between a real position and a decoded position of the magnetic head, simulation is performed by using a conventional disk storage device as a model. The simulation is performed in a case of an area pattern, for example, in which the position signals PosA, PosB, PosC, and PosD of four phases are obtained from the burst portion to obtain the decoded position.

FIGS. 3A, 4A, 5A and 6A are exemplary graphs of PosN and PosQ with respect to a real position of the magnetic head in a simulation result of the conventional disk storage device. FIGS. 3B, 4B, 5B and 6B are exemplary graphs of the real position and a decoded position of the magnetic head in the simulation result of the conventional disk storage device.

Figure 5A:
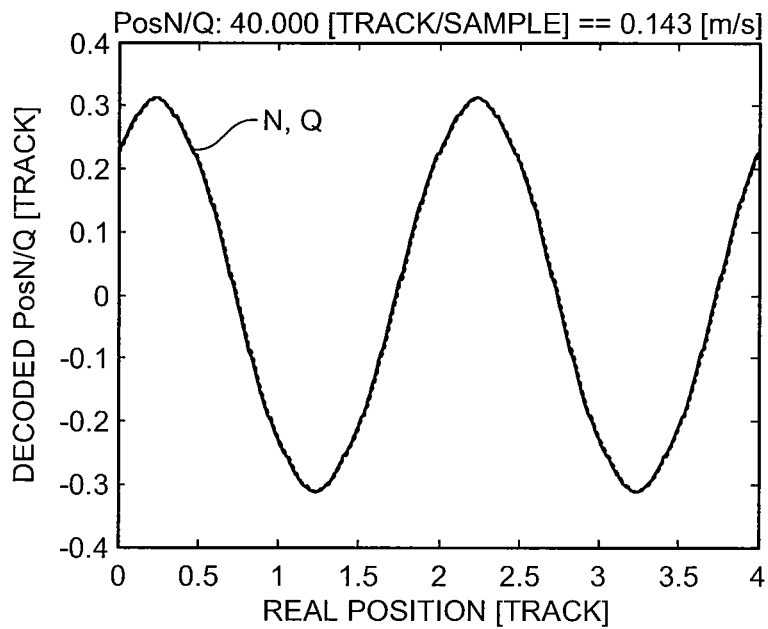
FIG. 5A is an exemplary graph of PosN and PosQ with respect to a real position of a magnetic head in a simulation result of a conventional disk storage device.
Figure 5B:
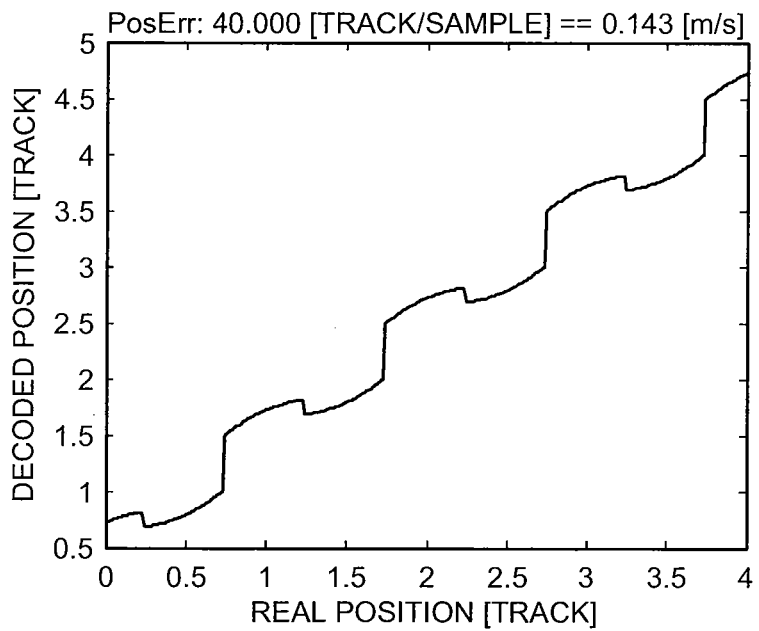
FIG. 5B is an exemplary graph of the real position and a decoded position of the magnetic head in the simulation result of the conventional disk storage device.

FIG. 5A and FIG. 5B illustrate the simulation result in the case where the velocity of the magnetic head in the radial direction is 0 track/sample. As illustrated in FIG. 5A, if the velocity of the magnetic head in the radial direction is 0 track/sample, the phase relationship between PosN and PosQ is a relationship in which they are shifted from each other by 0.5 track, and this coincide with the record in the burst portion. Therefore, as illustrated in FIG. 5B, no error occurs between the real position and the decoded position of the magnetic head.

Figure 4A:
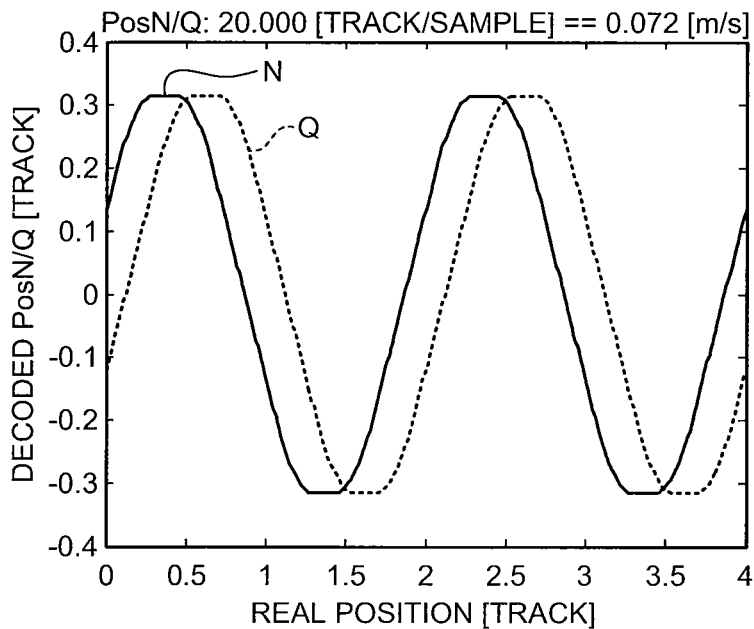
FIG. 4A is another exemplary graph of PosN and PosQ with respect to a real position of the magnetic head in a simulation result of the conventional disk storage device.
Figure 4B:
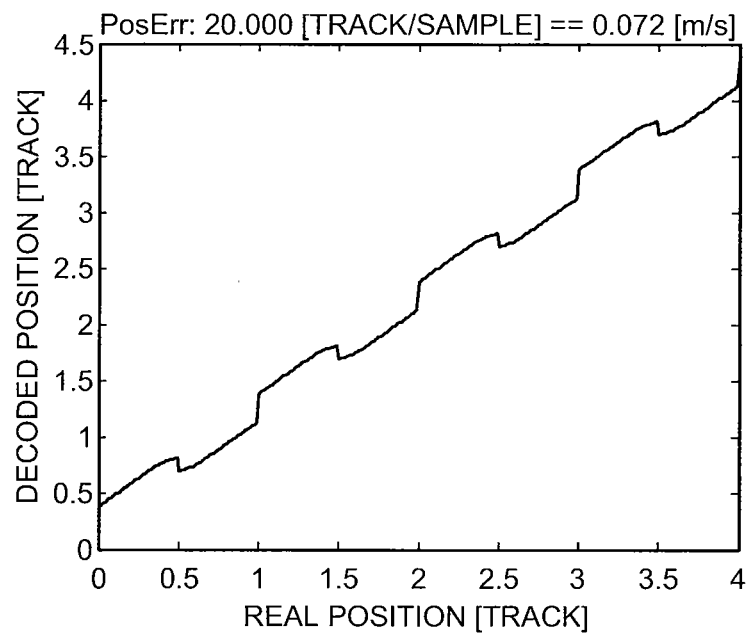
FIG. 4B is another exemplary graph of the real position and a decoded position of the magnetic head in the simulation result of the conventional disk storage device.

FIGS. 4A and 4B illustrate a simulation result of when the velocity of the magnetic head in the radial direction is 20 tracks/sample. As illustrated in FIG. 4A, when the velocity of the magnetic head in the radial direction is 20 tracks/sample, the phase relationship between PosN and PosQ is shifted from the state illustrated in FIG. 3A. More specifically, PosN is shifted to the right in FIG. 4A (direction of an increase in the tracks), whereas PosQ is shifted to the left in FIG. 4A (direction of a decrease in the tracks). Therefore, as illustrated in FIG. 4B, errors occur between the real position and the decoded position of the magnetic head. The errors are caused by the magnetic head traversing the servo patterns obliquely (directions of the arrows in FIGS. 1 and 2), and increase in proportion to the velocity of the magnetic head in the radial direction.

FIGS. 5A and 5B illustrate a simulation result in the case where the velocity of the magnetic head in the radial direction is 40 tracks/sample. As illustrated in FIG. 5A, when the velocity of the magnetic head in the radial direction is 40 tracks/sample, the phase relationship between PosN and PosQ is further shifted from the state illustrated in FIG. 4A. More specifically, the phase relationship between PosN and PosQ is zero.

Figure 6A:
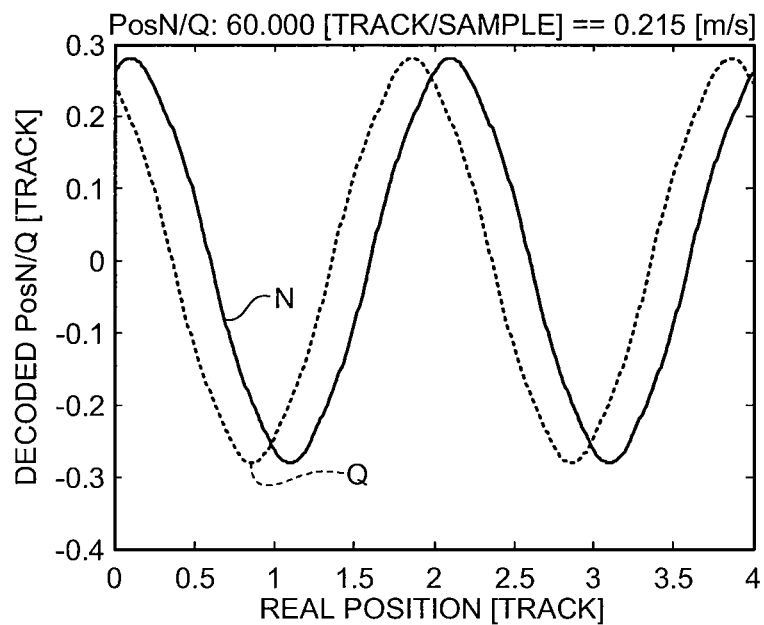
FIG. 6A is another exemplary graph of PosN and PosQ with respect to a real position of the magnetic head in a simulation result of the conventional disk storage device.
Figure 6B:
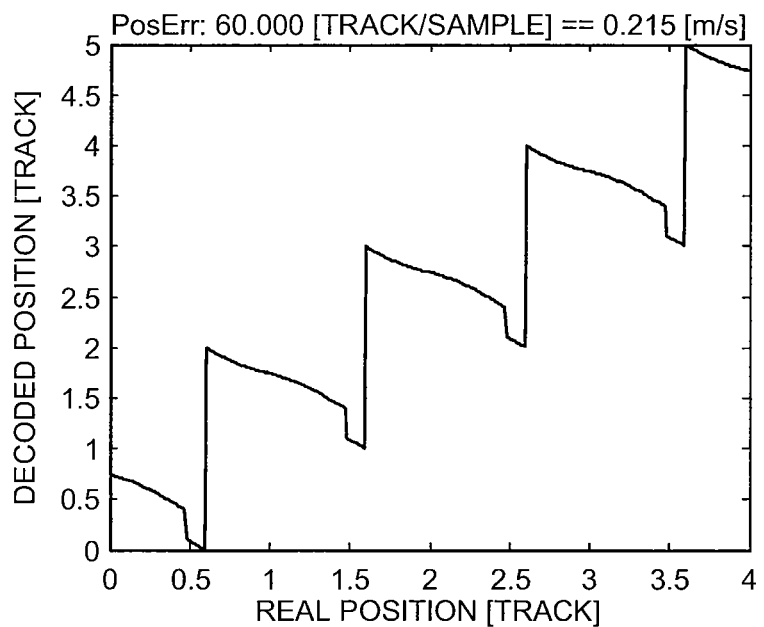
FIG. 6B is another exemplary graph of the real position and a decoded position of the magnetic head in the simulation result of the conventional disk storage device.
Figure 7A:
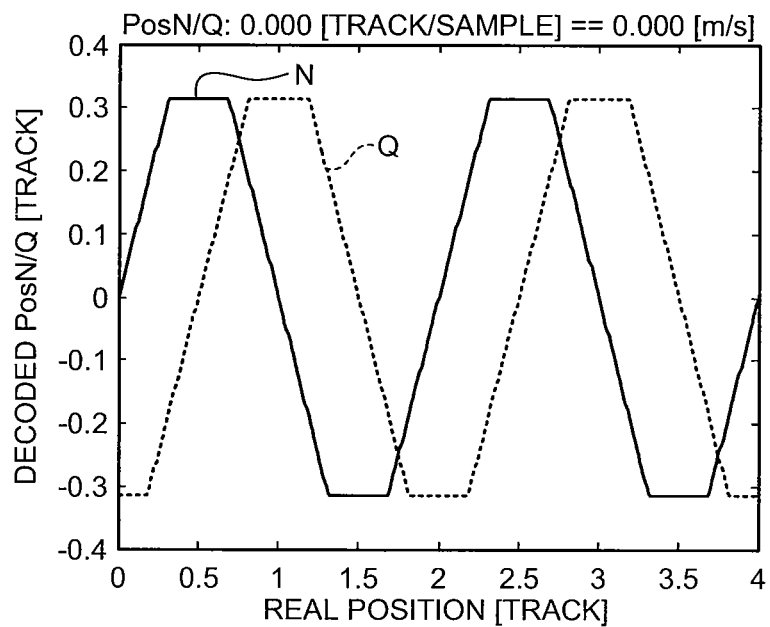
FIG. 7A is an exemplary graph of PosN and PosQ with respect to a real position of the magnetic head in a simulation result of the conventional disk storage device.
Figure 7B:
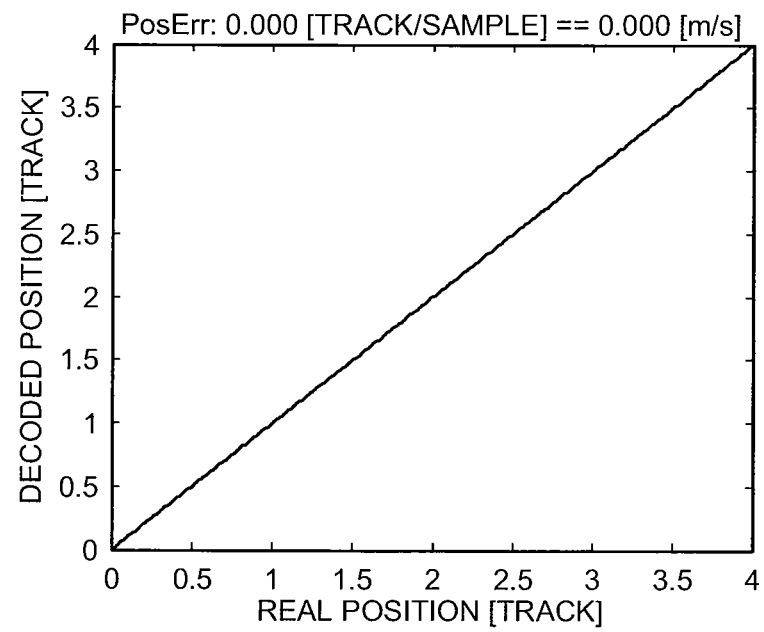
FIG. 7B is an exemplary graph of the real position and a decoded position of the magnetic head in the simulation result of the conventional disk storage device.
Figure 8A:
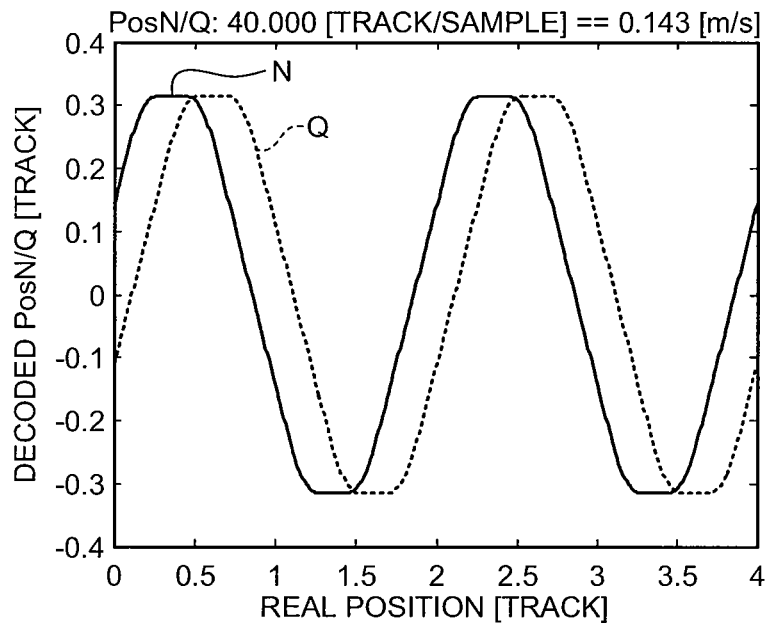
FIG. 8A is another exemplary graph of PosN and PosQ with respect to a real position of the magnetic head in a simulation result of the conventional disk storage device.
Figure 8B:
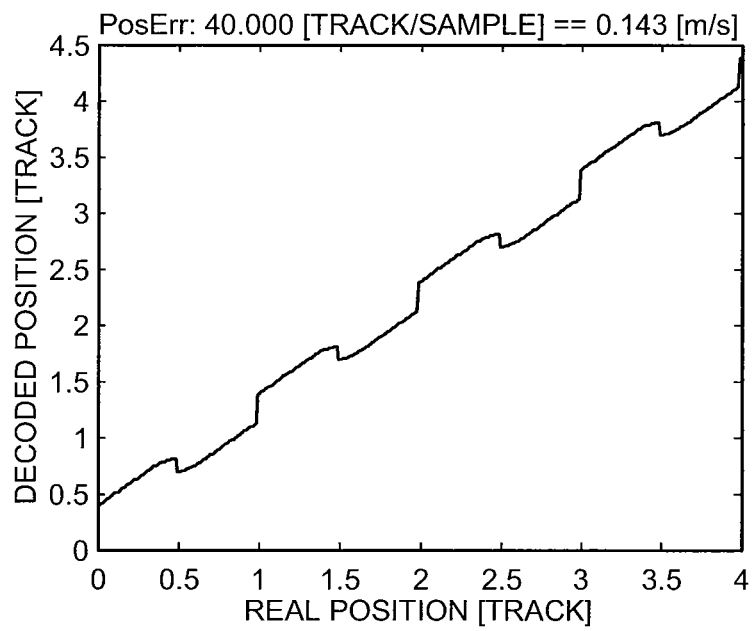
FIG. 8B is another exemplary graph of the real position and a decoded position of the magnetic head in the simulation result of the conventional disk storage device.
Figure 9A:
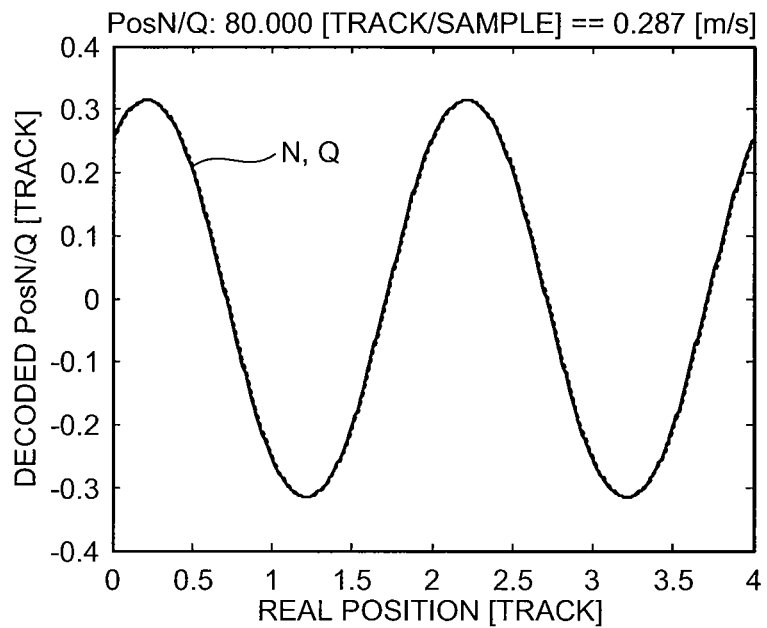
FIG. 9A is an exemplary graph of PosN and PosQ with respect to a real position of the magnetic head in a simulation result of the conventional disk storage device.
Figure 9B:
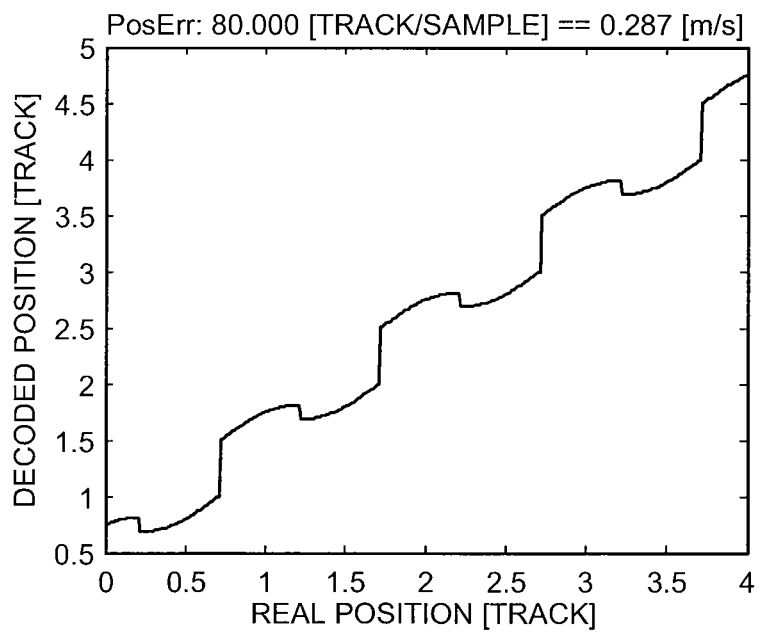
FIG. 9B is an exemplary graph of the real position and a decoded position of the magnetic head in the simulation result of the conventional disk storage device.
Figure 10A:
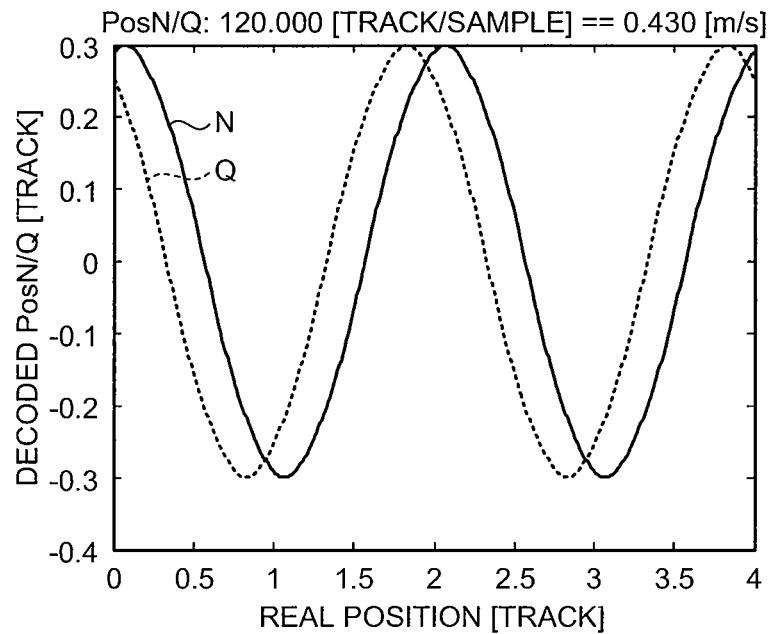
FIG. 10A is another exemplary graph of PosN and PosQ with respect to a real position of the magnetic head in a simulation result of the conventional disk storage device.
Figure 10B:
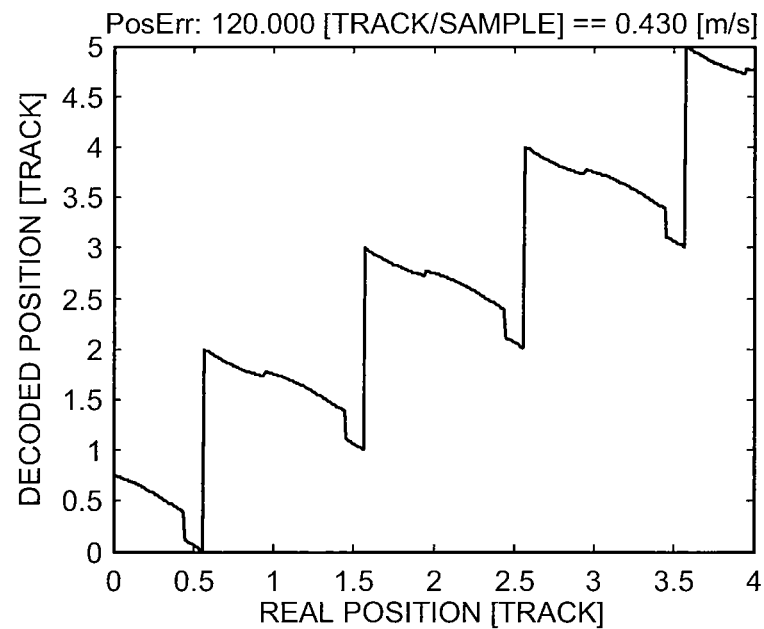
FIG. 10B is another exemplary graph of the real position and a decoded position of the magnetic head in the simulation result of the conventional disk storage device.

FIGS. 6A and 6B illustrate a simulation result in the case where the velocity of the magnetic head in the radial direction is 60 tracks/sample. As illustrated in FIG. 6A, when the velocity of the magnetic head in the radial direction is 60 tracks/sample, the phase relationship between PosN and PosQ is further shifted from the state illustrated in FIG. 5A, and is inverted. Therefore, the correspondence relationship between the decoded position and the real position is obscure, whereby the position of the magnetic head cannot be demodulated properly as illustrated in FIG. 6B. As described above, the velocity of the magnetic head in the radial direction has limit velocity (demodulation limit velocity) at which the correspondence relationship between the decoded position and the real position is obscure.

Similarly, a simulation result of the conventional disk storage device is illustrated in a case of the NULL pattern, for example, in which the position signals PosN and PosQ of two phases are obtained from the burst portion to obtain the decoded position. FIGS. 7A, 8A, 9A and 10A are exemplary graphs of PosN and PosQ with respect to a real position of the magnetic head in the simulation result of the conventional disk storage device. FIGS. 7B, 8B, 9B and 10B are exemplary graphs of the real position and a decoded position of the magnetic head in the simulation result of the conventional disk storage device.

As illustrated in FIG. 7A to FIG. 10B, in the case of a NULL pattern, it is found that the velocity of the magnetic head in the radial direction reaches the demodulation limit velocity at 80 tracks/sample. The demodulation limit velocity in this case is twice as high as that in the case of four phases (40 tracks/sample). This is attributed to the fact that the simulations are performed under the condition that one burst portion is made the same in size both in the cases of two phases and four phases.

Figure 11:
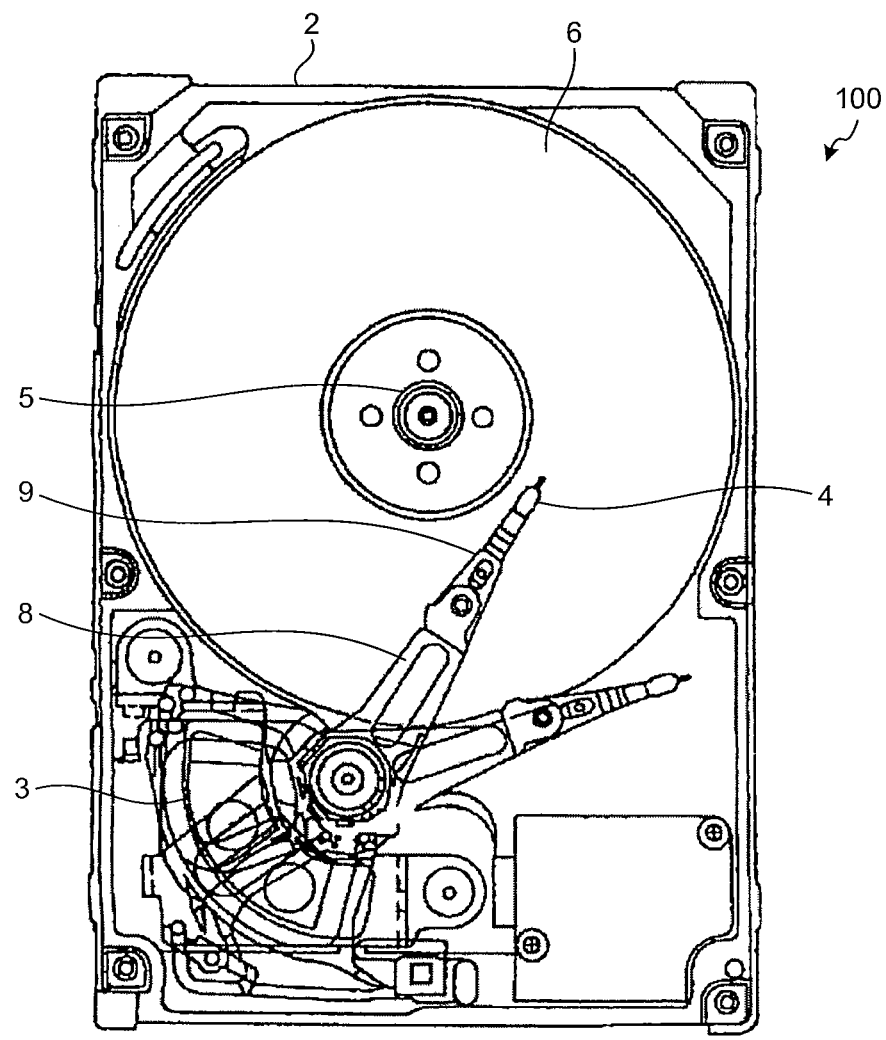
FIG. 11 is an exemplary top view of a disk storage device in the embodiment.
Figure 12:
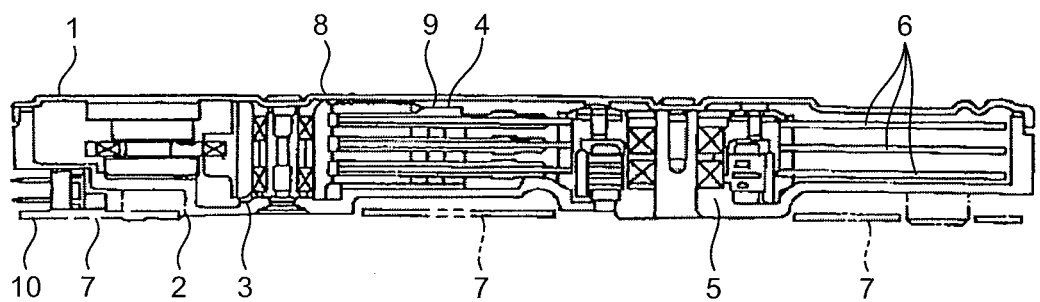
FIG. 12 is an exemplary cross-sectional view of the disk storage device in the embodiment.

The disk storage device according to the embodiment will now be described. FIG. 11 is an exemplary top view of a disk storage device 100 according to the embodiment. FIG. 12 is an exemplary cross-sectional view of the disk storage device 100 according to the embodiment. In the embodiment, a hard disk drive is used as an example of the disk storage device 100.

As illustrated in FIG. 11 and FIG. 12, the disk 6 is configured by forming a magnetic recording layer on a substrate (disk). The disk 6 is 2.5 inches in size, for example, and three disks 6 are provided in the drive. A spindle motor (SPM) 5 supports and rotates the disk 6. The magnetic head 4 is provided to an actuator. The actuator comprises a voice coil motor (VCM) 3, an arm 8, and a flexure 9 (suspension). Each magnetic head 4 is attached to an end of the flexure 9.

The magnetic head 4 reads and writes data from and to the disk 6. The magnetic head 4 comprises a magnetoresistive (MR) element (reproduction element) and a write element.

The VCM 3 drives the magnetic head 4 in the radial direction of the disk 6 to position the magnetic head 4 on a desired track of the disk 6. The VCM 3 and the SPM 5 are arranged on a drive base 2. A cover 1 covers the drive base 2 to separate the interior of the drive from the exterior. A printed circuit board 7 is arranged under the drive base 2 and has a control circuit of the drive mounted thereon. A connector 10 is also arranged under the drive base 2 to connect the control circuit and the exterior. The drive is small in size, and used as an internal disk for a notebook personal computer, for example.

Figure 13:
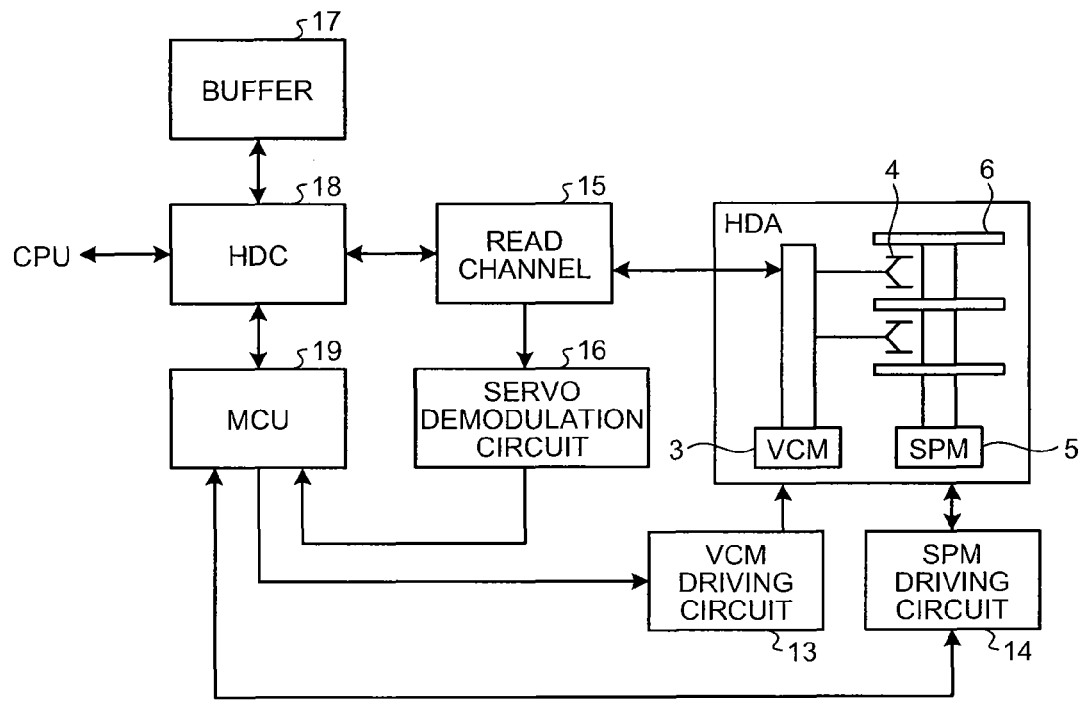
FIG. 13 is an exemplary block diagram of the disk storage device in the embodiment.

FIG. 13 is an exemplary block diagram illustrating the configuration of the disk storage device 100 according to the embodiment. A hard disk controller (HDC) 18 performs interface control for a host central processing unit (CPU) such as transfer of various types of commands and transfer of data therebetween, and generates a control signal for controlling a recording and reproducing format on the magnetic disk medium inside the magnetic disk device. A buffer 17 is used for storing therein write data supplied from the host CPU temporarily, and read data read from the magnetic disk medium temporarily.

A micro controller unit (MCU) 19 comprises a micro processing unit (MPU), a memory, a digital-to-analog (DA) converter, and an analog-to-digital (AD) converter. The MCU 19 performs servo control (positioning control) to position the magnetic head, for example. The MCU 19 executes a computer program stored in the memory to recognize a position signal supplied from a servo demodulation circuit 16, thereby calculating a control value of a VCM control current for the VCM 3 for positioning the magnetic head 4. Furthermore, the MCU 19 controls a driving current for an SPM driving circuit 14.

A VCM driving circuit 13 is formed of a power amplifier for applying a driving current to the VCM 3. The SPM driving circuit 14 is formed of a power amplifier for applying a driving current to the SPM 5 that rotates the disk 6.

Figure 15:
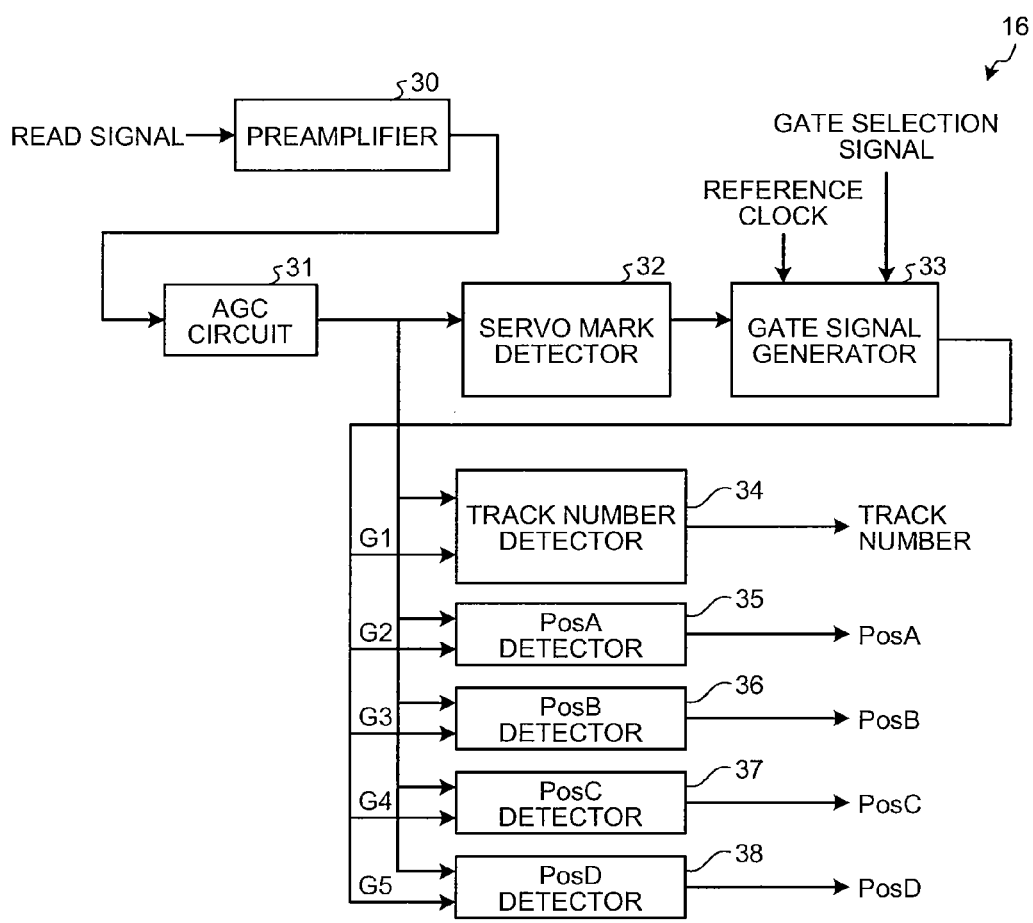
FIG. 15 is an exemplary block diagram of a servo demodulation circuit in the embodiment.

A read channel 15 is a circuit that performs recording and reproducing. The read channel 15 comprises a modulation circuit for recording write data supplied from the host CPU on the disk 6, a parallel-serial conversion circuit, a demodulation circuit for reproducing data from the disk 6, and a serial-parallel conversion circuit. The servo demodulation circuit 16, which will be described later with reference to FIG. 15, is a circuit that demodulates the servo pattern 60 recorded on the disk 6, and outputs a position signal thus demodulated to the MCU 19.

A head integrated circuit (IC), which is not illustrated, having a built-in write amplifier that supplies a recording current to the magnetic head 4 and a built-in preamplifier that amplifies reproducing voltage supplied from the magnetic head 4 is provided in the drive head/disk assembly (HDA).

Figure 14:
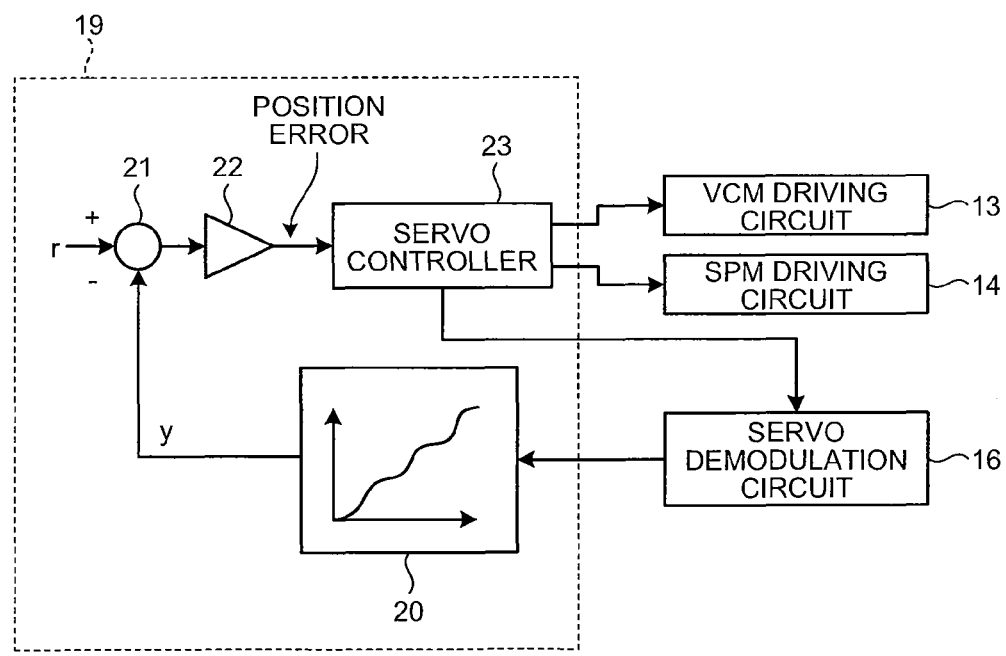
FIG. 14 is an exemplary block diagram of a positioning control system in the embodiment.

A positioning control system executed by the MCU 19 will now be described. FIG. 14 is an exemplary block diagram of the positioning control system.

As illustrated in FIG. 14, the positioning control system comprises the MCU 19, the VCM driving circuit 13, the SPM driving circuit 14, and the servo demodulation circuit 16. The MCU 19 outputs a control signal that controls driving of the VCM driving circuit 13 and the SPM driving circuit 14 based on the position signal supplied from the servo demodulation circuit 16. In addition, the MCU 19 outputs a gate selection signal that selects a gate signal generated in the servo demodulation circuit 16 (which will be described later in detail).

FIG. 15 is an exemplary block diagram of the servo demodulation circuit 16. As illustrated in FIG. 15, the servo demodulation circuit 16 comprises a preamplifier 30, an automatic gain control (AGC) circuit 31, a servo mark detector 32, a gate signal generator 33, a track number detector 34, a PosA detector 35, a PosB detector 36, a PosC detector 37, and a PosD detector 38.

The preamplifier 30 amplifies a read signal supplied from the read channel 15. The AGC circuit 31 adjusts the gain of the read signal, and performs control to keep the amplitude of the read signal constant. The servo mark detector 32 detects a servo mark (refer to FIGS. 1 and 2) from the read signal.

Figure 16:
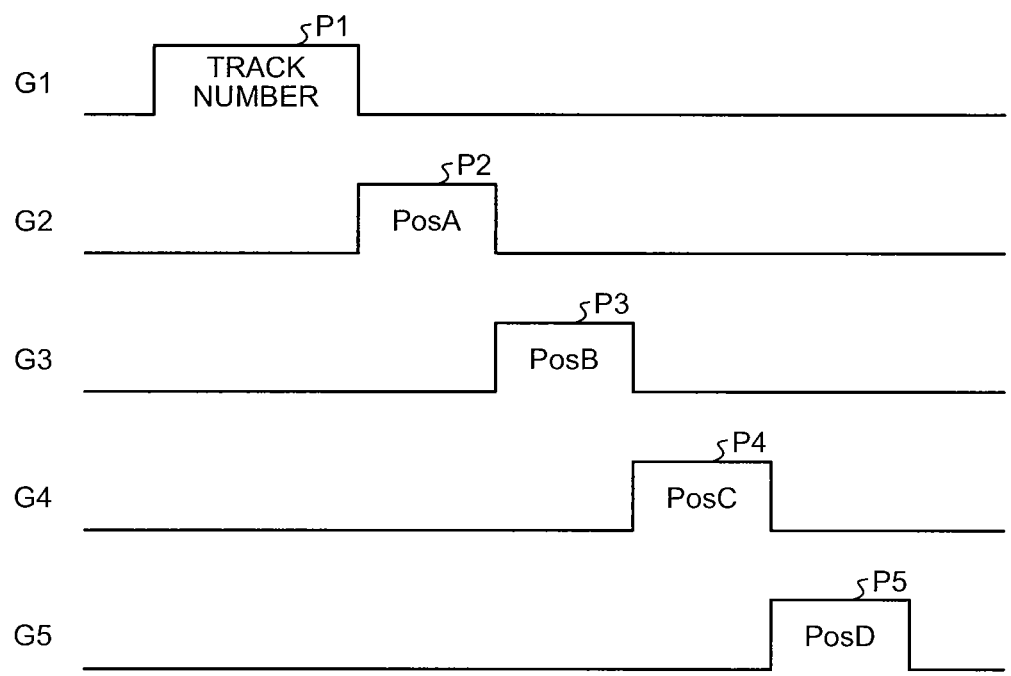
FIG. 16 is an exemplary timing chart of gate signals in the embodiment.

The gate signal generator 33 generates gate signals for the track number detector 34, the PosA detector 35, the PosB detector 36, the PosC detector 37, and the PosD detector 38 at operational timings synchronized with a reference clock to be input in accordance with detection of the servo mark. FIG. 16 is an exemplary timing chart of the gate signals. As illustrated in FIG. 16, in accordance with the detection of the servo mark, the gate signal generator 33 generates a gate signal G1 with a peak P1 synchronized with a timing for reading a track number included in the read signal. Further, in accordance with the detection of the servo mark, the gate signal generator 33 generates a gate signal G2 with a peak P2 synchronized with a timing for reading a position signal PosA included in the read signal. Further, in accordance with the detection of the servo mark, the gate signal timing for reading a position signal PosB included in the read signal in accordance with detection of the servo mark. Further, in accordance with the detection of the servo mark, the gate signal generator 33 generates a gate signal G4 with a peak P4 synchronized with a timing for reading a position signal PosC included in the read signal. Further, in accordance with the detection of the servo mark, the gate signal generator 33 generates a gate signal G5 with a peak P5 synchronized with a timing for reading a position signal PosD included in the read signal.

The track number detector 34 detects (reads) a track number included in the read signal in accordance with the gate signal G1, and outputs the track number. The PosA detector 35 detects (reads) the position signal PosA included in the read signal in accordance with the gate signal G2, and outputs the amplitude thereof as PosA. The PosB detector 36 detects (reads) the position signal PosB included in the read signal in accordance with the gate signal G3, and outputs the amplitude thereof as PosB. The PosC detector 37 detects (reads) the position signal PosC included in the read signal in accordance with the gate signal G4, and outputs the amplitude thereof as PosC. The PosD detector 38 detects (reads) the position signal PosD included in the read signal in accordance with the gate signal G5, and outputs the amplitude thereof as PosD.

The gate signal generator 33 generates the gate signals G2 to G5 with the peaks P2 to P5, respectively, of which timings are different from one another in accordance with an operation mode set in accordance with the gate selection signal output from the MCU 19.

Figure 17:
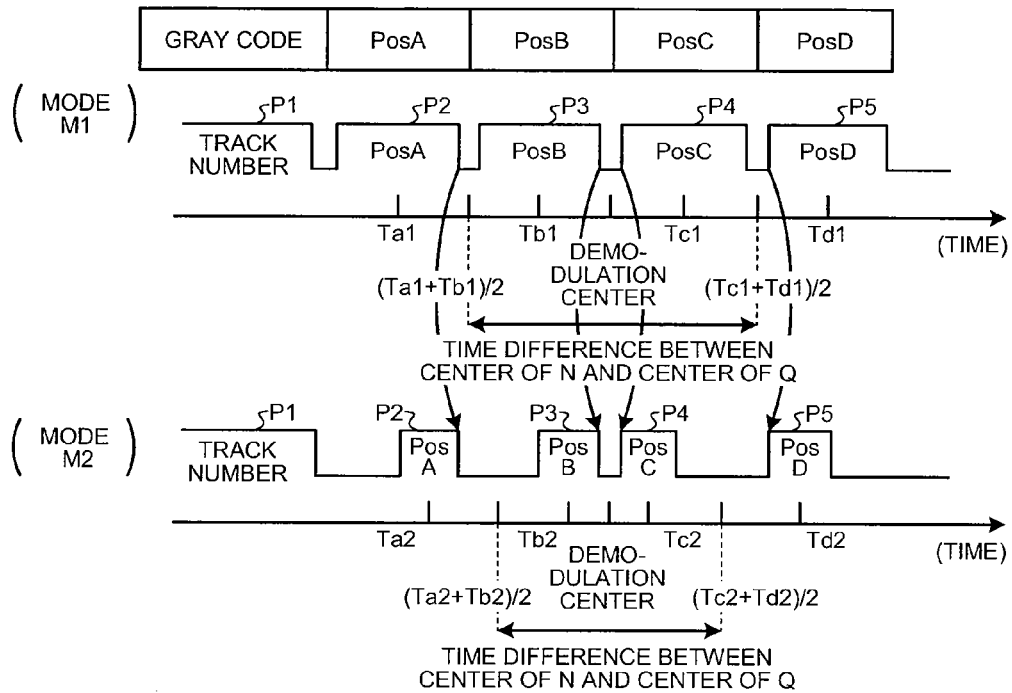
FIG. 17 is an exemplary conceptual diagram for explaining different timings of peaks, in the embodiment.

FIG. 17 is an exemplary conceptual diagram for explaining the timings of the peaks P2 to P5 that are different from each another. As illustrated in FIG. 17, if a mode M1 is set in accordance with the gate selection signal, center time points Ta1, Tb1, Tc1, and Td1 of the peaks P2 to P5 contained in the gate signals G2 to G5 generated by the gate signal generator 33 coincide with the centers of the position signals PosA to PosD of the servo mark, respectively. The periods of the peaks P2 to P5 substantially coincide with the widths of the position signals PosA to PosD of the servo mark, respectively. The timings of the peaks P2 to P5 of when the mode M1 is set are generated with reference to time points of rising and falling of the peaks P2 to P5 written in a register or the like in accordance with the time points estimated as the positions of the position signals PosA to PosD of the servo mark.

If a mode M2 is set in accordance with the gate selection signal, the periods for reading the peaks P2 to P5 included in the gate signals G2 to G5 generated by the gate signal generator 33 are made shorter (widths thereof are made smaller) than that of when the mode M1 is set. Specifically, the periods for reading are made approximately half of those of the mode M1. Furthermore, center time points Ta2, Tb2, Tc2, and Td2 of the peaks P2 to P5 are shifted closer to the center of the position signals PosA to PosD of the servo mark, that is, the time (demodulation center time) corresponding to the center of the burst portion. More specifically, the peaks P2 to P5 of when the mode M2 is set are generated by bringing close one of a rising timing and a falling timing of each of the peaks P2 to P5 of when the mode M1 is set to other one of the rising timing and the falling timing. Here, the other one of the rising timing and the falling timing is closer to the demodulation center time than the one of the rising timing and the falling timing.

Therefore, in the peaks P2 to P5 when the mode M2 is set, the center of PosN estimated as (Ta2+Tb2)/2 and the center of PosQ estimated as (Tc2+Td2)/2 are shifted toward the demodulation center time, compared with the case when the mode M1 is set. Accordingly, the peaks P2 to P5 of when the mode M2 is set, as indicated in the simulation described above, respond to the shifts of PosN and PosQ due to the increase in the velocity of the magnetic head 4 in the radial direction, whereby the demodulation limit velocity is improved and the error between the real position and the decoded position of the magnetic head 4 is expected to be reduced.

The timings of the peaks P2 to P5 of when the mode M2 is set, in the same manner as those in the mode M1, are generated with reference to time points of rising and falling of the peaks P2 to P5 written in a register or the like in accordance with the time points estimated as the positions of the position signals PosA to PosD with reference to the servo mark.

Figure 18:
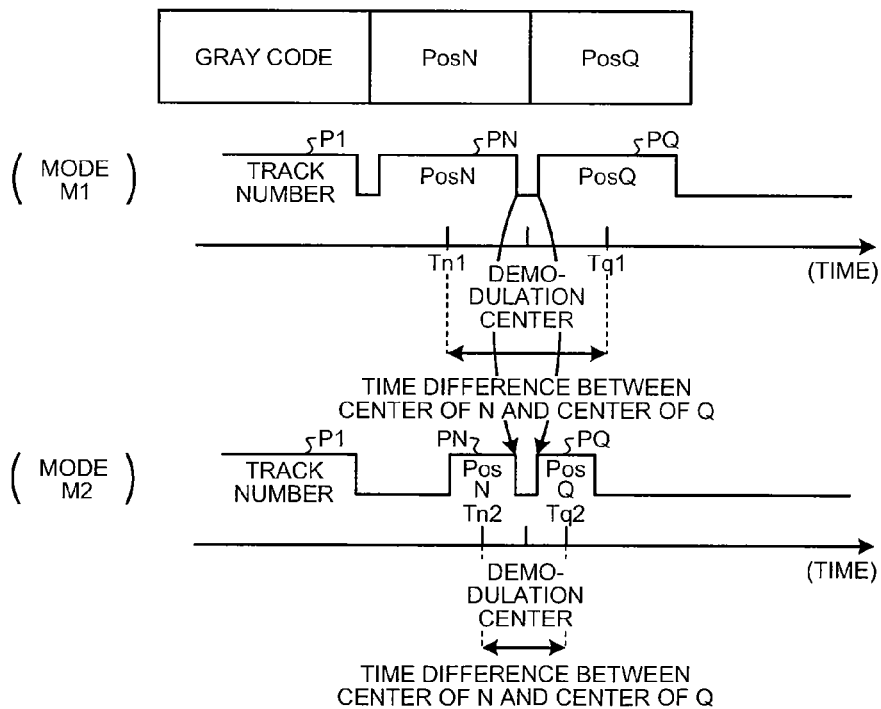
FIG. 18 is an exemplary conceptual diagram illustrating gate signals for a NULL pattern in the embodiment.

Gate signals corresponding to the NULL pattern of two phases will now be described. FIG. 18 is an exemplary conceptual diagram illustrating gate signals in the case of the NULL pattern. As illustrated in FIG. 18, in the same manner as in the case of the four phases described above, gate signals including a peak PN corresponding to reading of the position signal PosN and a peak PQ corresponding to reading of the position signal PosQ are generated for the NULL pattern.

More specifically, if the mode M1 is set in accordance with the gate selection signal, the center time points Tn1 and Tq1 of the peaks PN and PQ coincide with the centers of the position signals PosN and PosQ of the servo mark, respectively. Further, the periods of the peaks PN and PQ substantially coincide with the widths of the position signals PosN and PosQ of the servo mark, respectively. The timings of the peaks PN and PQ of when the mode M1 is set are generated with reference to time points of rising and falling of the peaks P2 to P5 written in a register or the like in accordance with the time points estimated as the positions of the position signals PosN and PosQ based on the servo mark.

If the mode M2 is set in accordance with the gate selection signal, the periods for reading the peaks PN and PQ are made shorter (widths thereof are made smaller) than that of when the mode M1 is set. Specifically, the periods for reading are made approximately half of those of when the mode M1 is set. Furthermore, center time points Tn2 and Tq2 of the peaks PN and PQ are shifted closer to the center of the position signals PosN and PosQ of the servo mark, that is, the time (demodulation center time) corresponding to the center of the burst portion. More specifically, the peaks PN and PQ of when the mode M2 is set are generated by bringing close one of a rising timing and a falling timing of each of the peaks PN and PQ of when the mode M1 is set to other one of the rising timing and the falling timing. Here, the other one of the rising timing and the falling timing is closer to the demodulation center time than the one of the rising timing and the falling timing.

Therefore, in the peaks PN and PQ of when the mode M2 is set, the center of PosN and the center of PosQ are shifted toward the demodulation center time compared with that of when the mode M1 is set. Accordingly, the peaks PN and PQ of when the mode M2 is set, as indicated in the simulation described above, respond to the shifts of PosN and PosQ due to the increase in the velocity of the magnetic head 4 in the radial direction, whereby the demodulation limit velocity is improved and the error between the real position and the decoded position of the magnetic head 4 is expected to be reduced.

The timings of the peaks PN and PQ of when the mode M2 is set, in the same manner as those in the mode M1, are generated with reference to time points of rising and falling of the peaks P2 to P5 written in a register or the like in accordance with the time points estimated as the positions of the position signals PosN and PosQ with reference to the servo mark.

Referring back to FIG. 14, the MCU 19 comprises a position demodulator 20, an error calculator 21, a gain correction module 22, and a servo controller 23. These modules are realized by dividing the functions of the MCU 19 into blocks. The servo controller 23 is a known servo controller that calculates the amount of control in accordance with position errors. In addition, the servo controller 23 outputs a gate selection signal depending on whether a seek operation for moving the magnetic head 4 to a target track on the disk 6 is performed.

Figure 19:
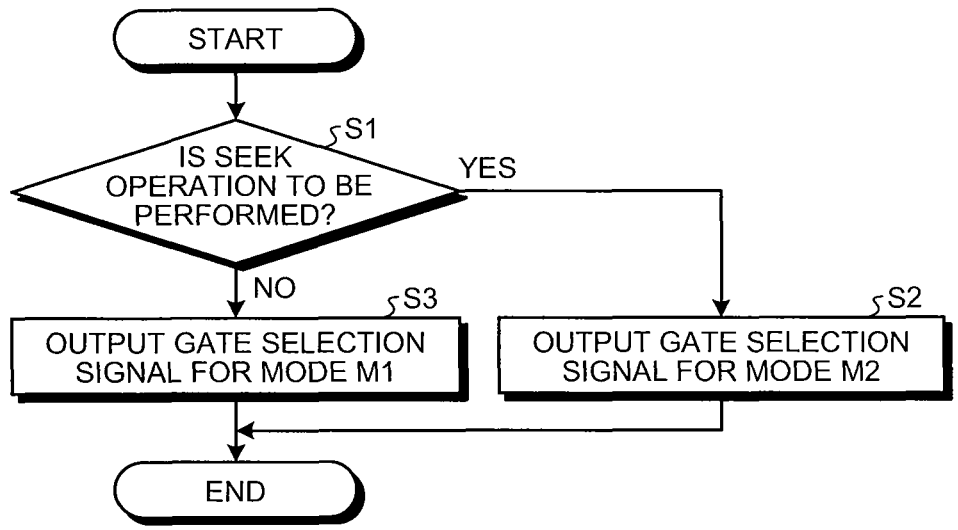
FIG. 19 is an exemplary flowchart of an operation relating to an output of a gate selection signal in the embodiment.

FIG. 19 is an exemplary flowchart of an operation relating to an output of the gate selection signal. As illustrated in FIG. 19, the servo controller 23 determines whether the seek operation is to be performed based on a command received from the HDC 18 (S1). If the seek operation is to be performed (Yes at S1), the servo controller 23 outputs the gate selection signal for setting the mode M2 to the servo demodulation circuit 16 (S2). If the seek operation is not to be performed (No at S1), the servo controller 23 outputs the gate selection signal for setting the mode M1 to the servo demodulation circuit 16 (S3). Therefore, in the disk storage device 100, when the seek operation is to be performed, a gate signal in accordance with the setting of the mode M2 is generated, and thus position signals are read from the servo mark.

Figure 20:
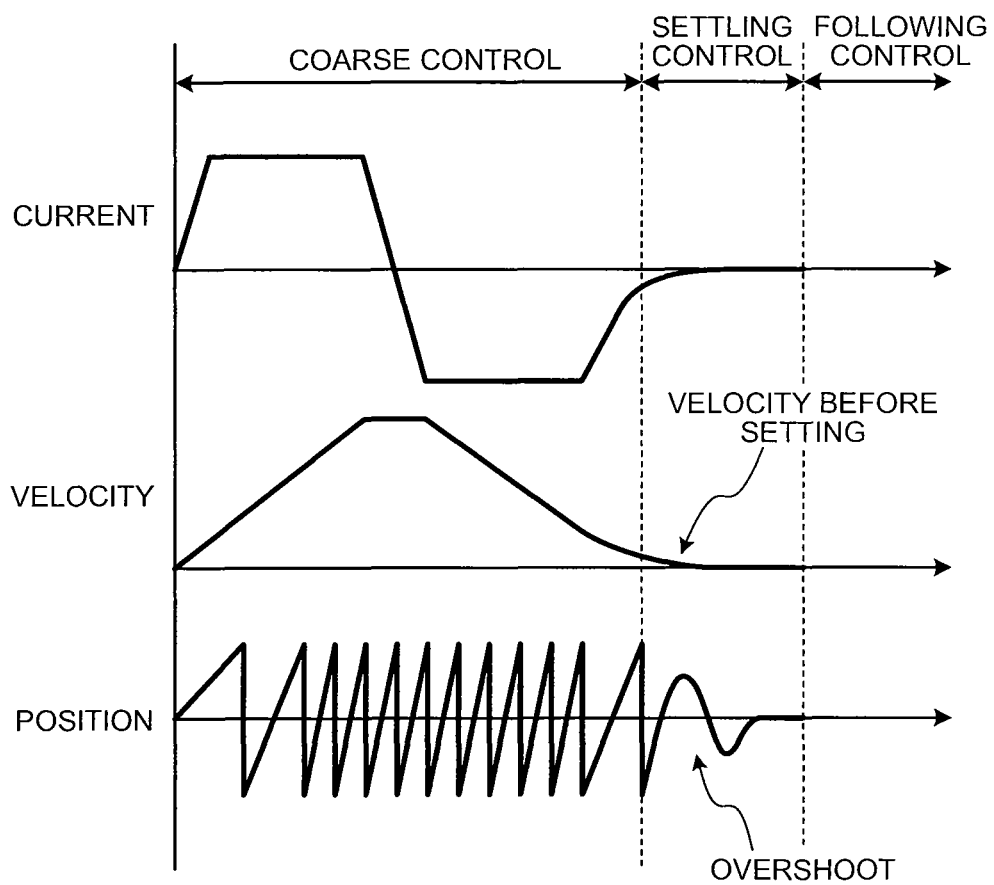
FIG. 20 is an exemplary diagram for explaining an operation of a servo controller in the embodiment.

In addition, the servo controller 23 performs coarse control, settling control, and following control in accordance with the position errors. FIG. 20 is an exemplary diagram for explaining an operation of the servo controller 23.

As illustrated in FIG. 20, the coarse control is velocity control to the target position. The coarse control comprises velocity control, proportional-derivative (PD) control, or observer control that does not include steady-state bias estimation. In addition, the coarse control switches control modes between acceleration, constant velocity, and deceleration. The acceleration mode provides such control that current is applied to increase the velocity. The constant-velocity mode provides such control that the current is set to "0" to keep the velocity constant. The deceleration mode provides such control that current is applied in a direction opposite to that in the acceleration mode to make the velocity approximately zero in the vicinity of the target position. If the distance is small, the constant-velocity mode is not performed.

The following control is control for causing the magnetic head 4 to follow the target position. The following control comprises proportional-integral-derivative (PID) control, PI×LeadLag, or observer control that includes steady-state bias estimation. The settling control is a control mode for connecting the coarse control and the following control. In the settling control, the control system includes an integral element.

The position demodulator 20 calculates the decoded position (Position) based on a track number, PosA, PosB, PosC, and PosD supplied from the servo demodulation circuit 16 by using Equations above. The error calculator 21 comprises: a first calculator that subtracts a target position r from a decoded position y to output a position error; and a second calculator that subtracts a target position from a track position to output a position error (neither of which is illustrated). The gain correction module 22 compares the actual velocity with the limiting velocity specified in advance to determine the velocity. In addition, the gain correction module 22 selects the position error to be output to the servo controller 23 from the position error calculated by the first calculator and the position error calculated by the second calculator, and outputs the selected position error to the servo controller 23.

To examine the relationship between the real position of the magnetic head 4 and a decoded position thereof, simulations are performed by using the disk storage device 100 according to the present embodiment as a model. These simulations are performed in a case of an area pattern, for example, in which the position signals of four phases, namely, PosA, PosB, PosC, and PosD, are obtained from a burst portion to obtain the decoded position.

Figure 21A:
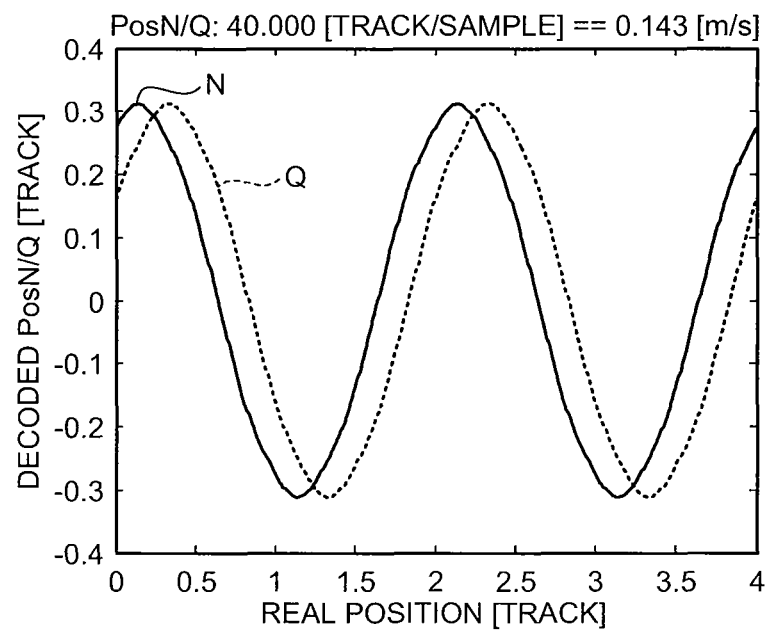
FIG. 21A is an exemplary graph illustrating a status of PosN and PosQ with respect to a real position of the magnetic head in a simulation result of a disk storage device in the embodiment.
Figure 21B:
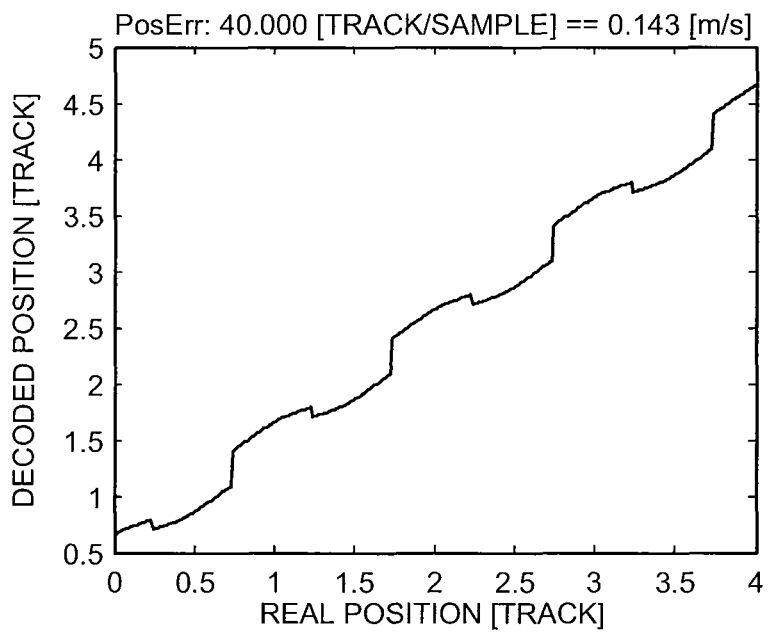
FIG. 21B is an exemplary graph of the real position and a decoded position of the magnetic head in the simulation result of the disk storage device in the embodiment.
Figure 22A:
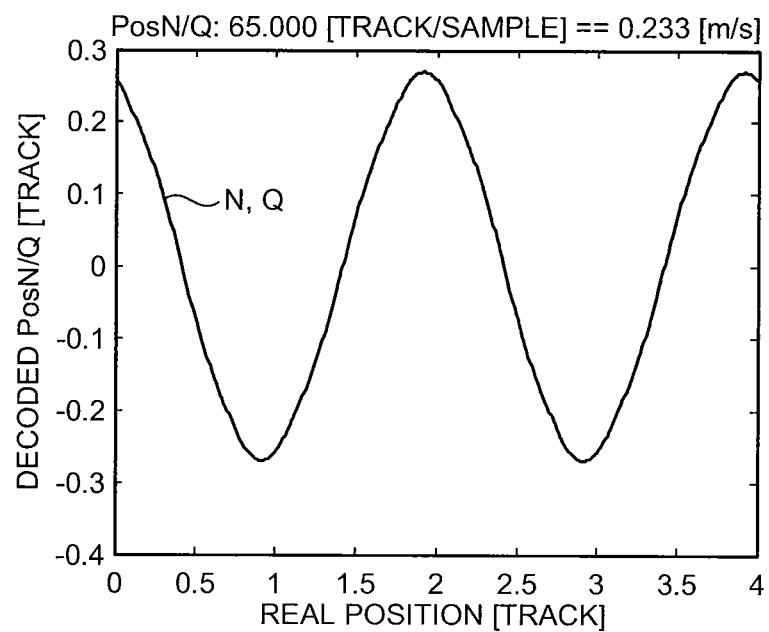
FIG. 22A is an exemplary graph of PosN and PosQ with respect to a real position of the magnetic head in a simulation result of the disk storage device in the embodiment.
Figure 22B:
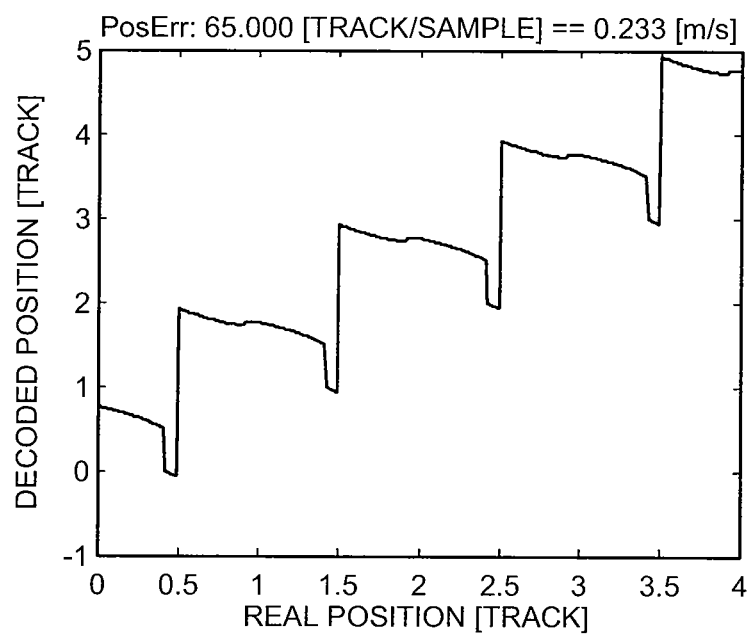
FIG. 22B is an exemplary graph of the real position and a decoded position of the magnetic head in the simulation result of the disk storage device in the embodiment.

FIGS. 21A and 22A are graphs of PosN and PosQ with respect to the real position of the magnetic head 4 in simulation results of the disk storage device 100 according to the embodiment. FIGS. 21B and 22B are graphs illustrating the relationship between the real position and a decoded position of the magnetic head 4 in the simulation results of the disk storage device 100 according to the embodiment.

FIGS. 21A and 21B illustrate the simulation result in the case where the velocity of the magnetic head 4 in the radial direction is 40 tracks/sample. This velocity is the demodulation limit velocity in the case of the conventional disk storage device (refer to FIG. 5A and FIG. 5B). As illustrated in FIG. 21A and FIG. 21B, because the gate signal in accordance with the setting of the mode M2 is generated in the disk storage device 100 according to the embodiment, the velocity of the magnetic head 4 does not reach the demodulation limit velocity.

FIGS. 22A and 22B illustrate the simulation result in the case where the velocity of the magnetic head 4 in the radial direction is 65 tracks/sample. As illustrated in FIG. 22A and FIG. 22B, in the disk storage device 100 according to the embodiment, the velocity of the magnetic head 4 in the radial direction reaches the demodulation limit velocity at 65 tracks/sample. In other words, the demodulation limit velocity is improved by approximately 50% compared with that of the conventional disk storage device.

Figure 23A:
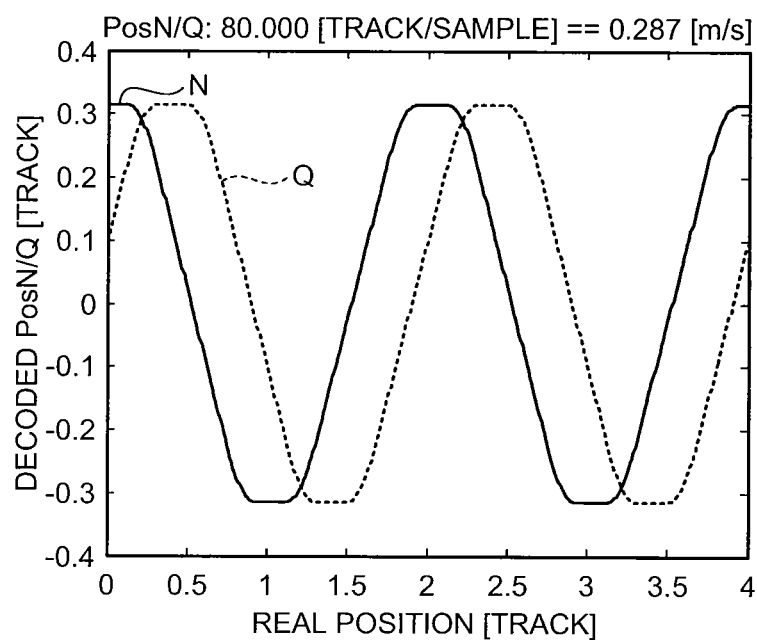
FIG. 23A is an exemplary graph of PosN and PosQ with respect to a real position of the magnetic head in a simulation result of the disk storage device in the embodiment.
Figure 23B:
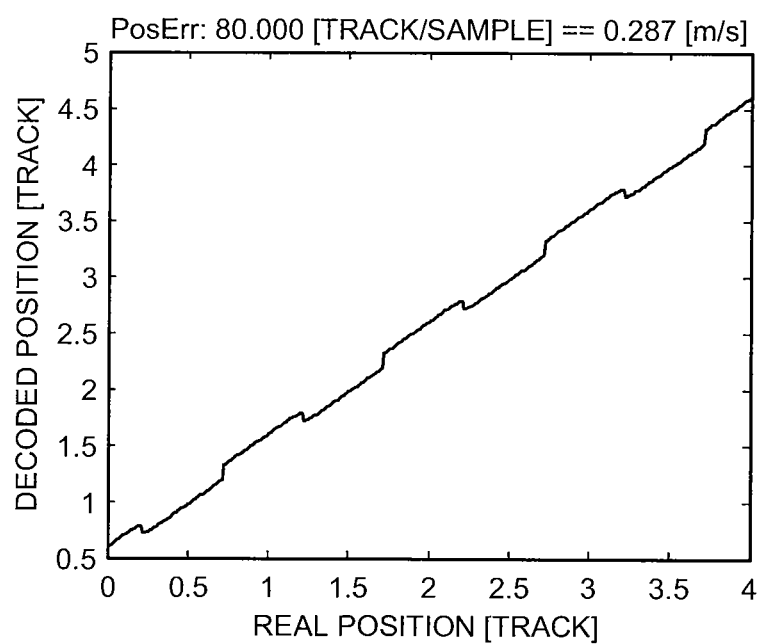
FIG. 23B is an exemplary graph of the real position and a decoded position of the magnetic head in the simulation result of the disk storage device in the embodiment.
Figure 24A:
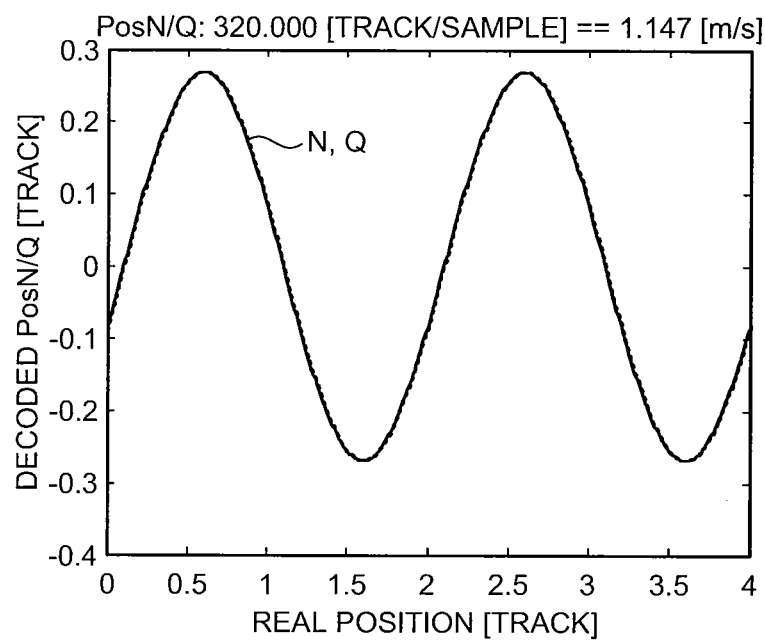
FIG. 24A is an exemplary graph of PosN and PosQ with respect to a real position of the magnetic head in a simulation result of the disk storage device in the embodiment.
Figure 24B:
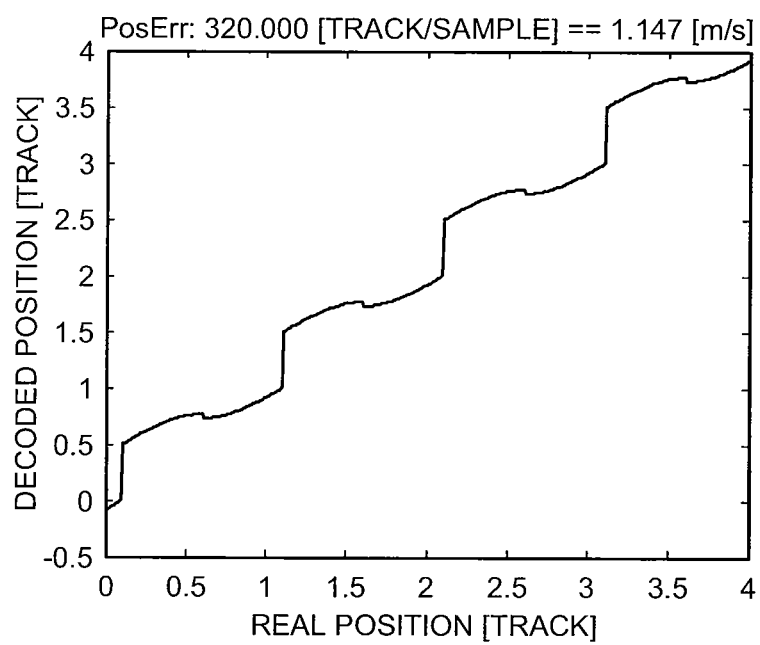
FIG. 24B is an exemplary graph of the real position and a decoded position of the magnetic head in the simulation result of the disk storage device in the embodiment.

Similarly, simulation results of the disk storage device 100 according to the embodiment are illustrated in a case of the NULL pattern, for example, in which the position signals of two phases, namely, PosN and PosQ, are obtained from the burst portion to obtain the decoded position. FIGS. 23A and 24A are graphs of PosN and PosQ with respect to the real position of the magnetic head 4 in the simulation results of the disk storage device 100 according to the embodiment. FIGS. 23B and 24B are graphs of the real position and a decoded position of the magnetic head 4 in the simulation results of the disk storage device 100 according to the embodiment.

FIGS. 23A and 23B illustrate the simulation result in the case where the velocity of the magnetic head 4 in the radial direction is 80 tracks/sample. This velocity is the demodulation limit velocity in the case of the conventional disk storage device (refer to FIG. 9A and FIG. 9B). As illustrated in FIG. 23A and FIG. 23B, because the gate signal in accordance with the setting of the mode M2 is generated in the disk storage device 100 according to the embodiment, the velocity of the magnetic head 4 does not reach the demodulation limit velocity.

FIGS. 24A and 24B illustrate the simulation result in the case where the velocity of the magnetic head 4 in the radial direction is 320 tracks/sample. As illustrated in FIG. 24A and FIG. 24B, in the disk storage device 100 according to the embodiment, the velocity of the magnetic head 4 in the radial direction reaches the demodulation limit velocity at 320 tracks/sample. In other words, the demodulation limit velocity is approximately four times as high as that of the conventional disk storage device. Furthermore, it is found that the effect of improving the demodulation limit velocity in the NULL pattern is larger than that in the area pattern. As described above, in the disk storage device 100 according to the embodiment, because the demodulation limit velocity, which is one of the factors preventing the improvement of the response performance in the seek operation, is improved, the response performance in the seek operation can be further improved.

Figure 25:
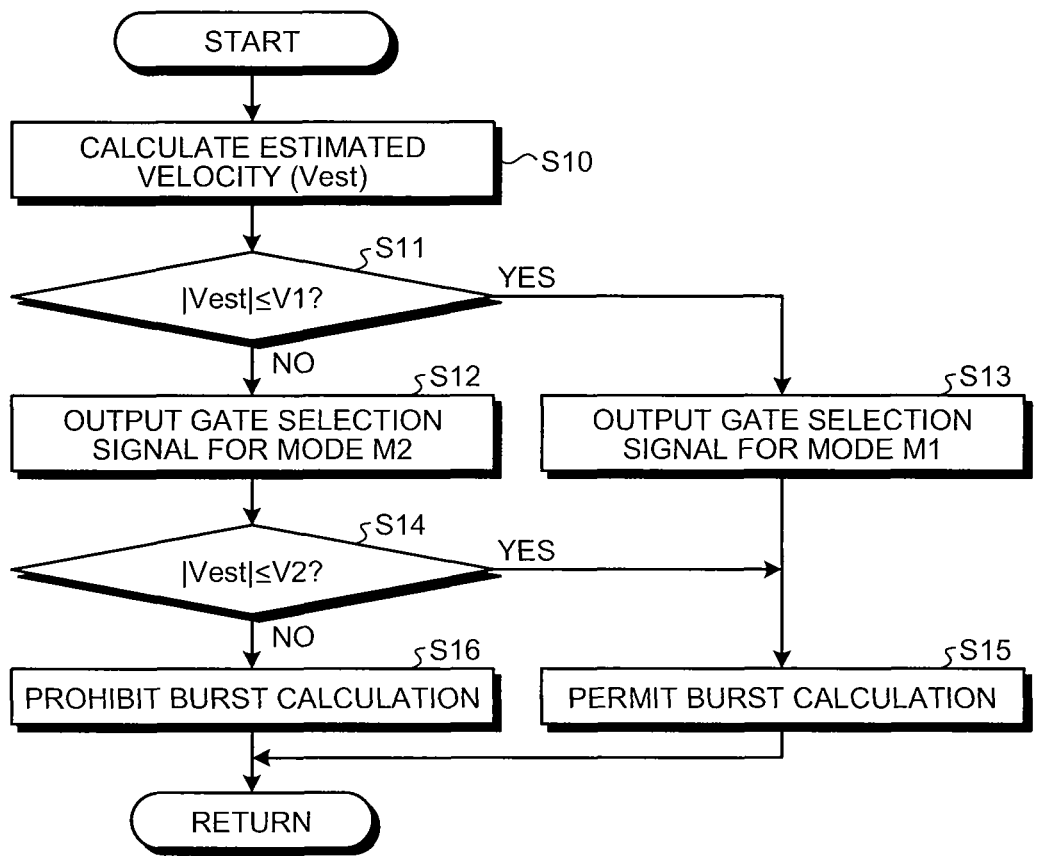
FIG. 25 is an exemplary flowchart of an operation relating to switching of gate signals in accordance with the moving velocity of the magnetic head in the embodiment.

A description will be made of the case in which the gate signals generated by the gate signal generator 33 are switched in accordance with the moving velocity of the magnetic head 4 in the radial direction. FIG. 25 is a flowchart illustrating an example of an operation relating to switching of the gate signals in accordance with the moving velocity of the magnetic head 4. The sequential operation illustrated in FIG. 25 is started when the seek operation is started, and performed once for each sample (decoded position thus calculated) in the seek operation, for example.

As illustrated in FIG. 25, when the seek operation is started, the servo controller 23 serving as a calculation module calculates estimated velocity (Vest) of the magnetic head 4 in the radial direction (S10). Specifically, the servo controller 23 stacks the decoded position calculated by the position demodulator 20 as a sample in accordance with reading of the servo mark, and compares (differentiates) the sample with the next sample to calculate the estimated velocity. Alternatively, the servo controller 23 may calculate the estimated velocity by referring to data in which the estimated velocities calculated by a predetermined formula are arranged in a table of each element, such as the execution state (command being executed and the execution time thereof) of the command received from the HDC 18, and the decoded position calculated by the position demodulator 20.

Subsequently, the servo controller 23 determines whether the absolute value of Vest is less than or equal to a predetermined reference velocity (V1), that is, whether the magnitude of the estimated velocity of the magnetic head 4 is equal to or smaller than that of the reference velocity (V1) (S11). If the magnitude of the estimated velocity of the magnetic head 4 is less than or equal to that of the reference velocity (V1) (Yes at S11), the servo controller 23 outputs the gate selection signal for setting the mode M1 to the servo demodulation circuit 16 (S13), and permits the calculation (burst calculation) of the decoded position using the position signals in the burst portion (S15).

If the magnitude of the estimated velocity of the magnetic head 4 is greater than that of the reference velocity (V1) (No at S11), the servo controller 23 outputs the gate selection signal for setting the mode M2 to the servo demodulation circuit 16 (S12). In the servo demodulation circuit 16, if the estimated velocity of the magnetic head 4 is greater than the reference velocity (V1), the gate signal in accordance with the setting of the mode M2 is generated, whereas if the estimated velocity of the magnetic head 4 is less than or equal to the reference velocity (V1), the gate signal in accordance with the setting of the mode M1 is generated. Accordingly, if the estimated velocity of the magnetic head 4 is low and close to the velocity in the following operation, because the read period of the position signals can be made long by the gate signal in accordance with the setting of the mode M1, the noise resistance performance can be improved. On the contrary, if the estimated velocity of the magnetic head 4 is high, because the demodulation limit velocity is expected to be improved by the gate signal in accordance with the setting of the mode M2 as described above, the response performance in the seek operation is expected to be further improved.

Subsequently to S12, the servo controller 23 determines whether the absolute value of Vest is less than or equal to a reference velocity (V2) preliminarily specified as a value larger than the reference value (V1), that is, whether the magnitude of the estimated velocity of the magnetic head 4 is less than or equal to that of the reference velocity (V2) (S14). As the reference velocity (V2), a value slightly smaller than the value expected to be the demodulation limit velocity is preliminarily specified in advance.

If the magnitude of the estimated velocity of the magnetic head 4 is less than or equal to that of the reference velocity (V2) (Yes at S14), the servo controller 23 permits the burst calculation (S15). By contrast, if the magnitude of the estimated velocity of the magnetic head 4 is larger than that of the reference velocity (V2) (No at S14), the servo controller 23 prohibits the burst calculation (S16). In other word, in the servo demodulation circuit 16, the calculation of the decoded position using the position signals in the burst portion is stopped. Therefore, when the estimated velocity of the magnetic head 4 is close to the demodulation limit velocity, the calculation of the decoded position is stopped, whereby an uncertain decoded position is prevented from being output from the position demodulator 20.

Figure 26:
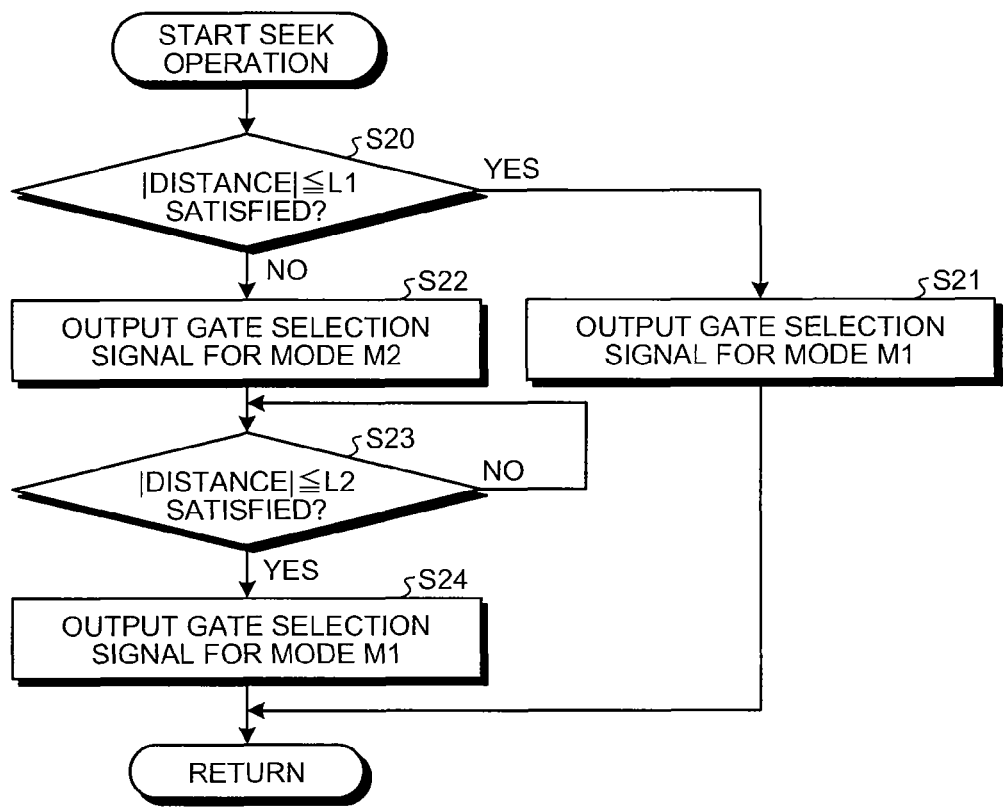
FIG. 26 is an exemplary flowchart of an operation relating to switching of the gate signals in accordance with a seek distance in the embodiment.

A description will be made of the case in which the gate signals generated by the gate signal generator 33 are switched in accordance with the distance (seek distance) between a target track and the position of the magnetic head 4 when the seek operation is started. FIG. 26 is a flowchart illustrating an example of an operation relating to switching of the gate signals in accordance with the seek distance.

As illustrated in FIG. 26, when the seek operation is started, the servo controller 23 determines whether the distance (seek distance) between a target track in response to a command received from the HDC 18 and the decoded position calculated by the position demodulator 20, that is, the position of the magnetic head 4 is less than or equal to a predetermined threshold level (L1) (S20).

If the seek distance is less than or equal to the threshold level (L1) (Yes at S20), the servo controller 23 outputs the gate selection signal for setting the mode M1 to the servo demodulation circuit 16 (S21). If the seek distance is greater than the threshold level (L1) (No at S20), the servo controller 23 outputs the gate selection signal for setting the mode M2 to the servo demodulation circuit 16 (S22). The maximum velocity of the magnetic head 4 in the seek operation can be estimated in advance if the seek distance is determined. Accordingly, as described above, the gate signals to be generated may be switched in accordance with the seek distance.

Subsequently to S22, the servo controller 23 determines whether the seek distance is less than or equal to a threshold level (L2) preliminarily specified as a level smaller than the threshold level (V1) (S23). As the threshold level (L2), a level at which the position of the magnetic head 4 is sufficiently close to the target track, and that is estimated as a seek distance small enough for the magnetic head 4 to switch to the following operation is preliminarily specified.

If the seek distance is greater than the threshold level (L2) (No at S23), the process stands by. If the seek distance is less than or equal to the threshold level (L2) (Yes at S23), the servo controller 23 outputs the gate selection signal for setting the mode M1 to the servo demodulation circuit 16, and switches the settings from the setting of the mode M2 (S24). Accordingly, if the seek distance is small enough for the magnetic head 4 to switch to the following operation, the read period of the position signals is made long by switching to the gate signal in accordance with the setting of the mode M1, thereby improving the noise resistance performance.

Figure 27:
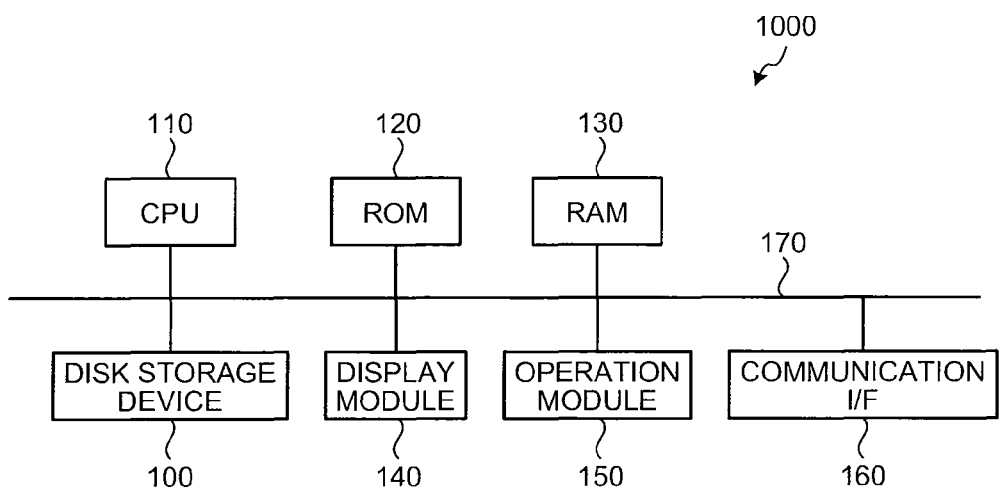
FIG. 27 is an exemplary block diagram of an electronic device comprising the disk storage device in the embodiment.

The electronic device comprising the disk storage device 100 according to the embodiment will now be described. FIG. 27 is an exemplary block diagram illustrating an electronic device 1000 comprising the disk storage device 100 according to the embodiment.

As illustrated in FIG. 27, the electronic device 1000 comprises the disk storage device 100, a central processing unit (CPU) 110, a read only memory (ROM) 120, a random access memory (RAM) 130, a display module 140 such as a liquid crystal display (LCD), an operation module 150 such as a keyboard and a pointing device, and a communication interface (I/F) 160 for connecting the electronic device 1000 to the Internet or the like. These modules including the disk storage device 100 are connected via a bus 170, and operate under the control performed by the CPU 110. Specific examples of the electronic device 1000 include a personal computer (PC), a notebook PC, a hard disk drive (HDD) recorder, and a television receiving apparatus having an HDD built-in.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage device, comprising:
  a disk on which a servo pattern is recorded, the servo pattern comprising, for each track, a recording area, a plurality of position signals for detecting an offset position from a center of the respective track being recorded in the recording area;
  a head configured to read data recorded on the disk as the disk is being rotated;
  a driver configured to drive the head in a radial direction of the disk;

a signal generator configured to generate a first timing signal indicating a timing for reading the position signals from the read data;

a demodulator configured to demodulate a position of the head based on the position signals read in accordance with the generated first timing signal; and a controller configured to control the driver based on the demodulated position of the head, wherein, when the controller performs a seek operation for moving the head to a target track, the signal generator is configured to generate a second timing signal, a period of the second timing signal for reading the position signals being shorter than that of the first timing signal, a center time of the period of the second timing signal being shifted closer than that of the first timing signal to a demodulation center time corresponding to a center of the recording area, and wherein, the second timing signal is obtained by bringing close one of a rising timing and a falling timing of the first timing signal to other one of the rising timing and the falling timing for each of the position signals, the other one of the rising timing and the falling timing being closer than the one of the rising timing and the falling timing to the demodulation center time.

2. The disk storage device of claim 1, further comprising:
a calculator configured to calculate a moving velocity of the head in the radial direction, wherein the signal generator is configured to generate the second timing signal when the calculated moving velocity is greater than a preset first reference velocity, and to generate the first timing signal when the calculated moving velocity is less than or equal to the first reference velocity.

3. The disk storage device of claim 2, wherein the demodulator is configured to stop demodulating the position of the head based on the read position signals when the calculated moving velocity is greater than a second reference velocity preliminarily specified as a value greater than the first reference velocity.

4. The disk storage device of claim 2, wherein the position signals recorded in the recording area represent a four phase pattern.

5. The disk storage device of claim 2, wherein the position signals recorded in the recording area represent a two phase pattern.

6. The disk storage device of claim 1, wherein the signal generator is configured to generate the second timing signal when a distance between the target track and the position of the head when the seek operation is started is larger than a preset first threshold value, and to generate the first timing signal when the distance is less than or equal to the first threshold value.

7. The disk storage device of claim 6, wherein, when the distance between the target track and the position of the head is less than or equal to a second threshold value preliminarily set to be less than the first threshold value and while generating the second timing signal, the signal generator switches to generating the first timing signal.

8. The disk storage device of claim 1, wherein the position signals recorded in the recording area represent a four phase pattern.

9. The disk storage device of claim 1, wherein the position signals recorded in the recording area represent a two phase pattern.

10. A controller of a disk storage device, comprising a disk on which a servo pattern is recorded, a head, and a driver, the servo pattern comprising, for each track, a recording area, a plurality of position signals for detecting an offset position from a center of the respective track being recorded in the recording area, the head being configured to read data recorded on the disk as the disk is being rotated, the driver being configured to drive the head in a radial direction of the disk, the controller comprising:

a signal generator configured to generate a first timing signal indicating a timing for reading the position signals from the read data;

a demodulator configured to demodulate a position of the head based on the position signals read in accordance with the generated first timing signal; and a controller configured to control the driver based on the demodulated position of the head, wherein, when the controller performs a seek operation for moving the head to a target track, the signal generator is configured to generate a second timing signal, a period of the second timing signal for reading the position signals being shorter than that of the first timing signal, a center time of the period of the second timing signal being shifted closer than that of the first timing signal to a demodulation center time corresponding to a center of the recording area, and wherein, the second timing signal is obtained by bringing close one of a rising timing and a falling timing of the first timing signal to other one of the rising timing and the falling timing for each of the position signals, the other one of the rising timing and the falling timing being closer than the one of the rising timing and the falling timing to the demodulation center time.

11. The controller of claim 10, further comprising:
a calculator configured to calculate a moving velocity of the head in the radial direction, wherein the signal generator is configured to generate the second timing signal when the calculated moving velocity is greater than a preset first reference velocity, and to generate the first timing signal when the calculated moving velocity is less than or equal to the first reference velocity.

12. The controller of claim 10, wherein the signal generator is configured to generate the second timing signal when a distance between the target track and the position of the head when the seek operation is started is larger than a preset first threshold value, and to generate the first timing signal when the distance is less than or equal to the first threshold value.

13. The controller of claim 10, wherein the position signals recorded in the recording area represent a four phase pattern.

14. The controller of claim 10, wherein the position signals recorded in the recording area represent a two phase pattern.

15. A controlling method of a disk storage device, comprising a disk on which a servo pattern is recorded, a head, and a driver, the servo pattern comprising, for each track, a recording area, a plurality of position signals for detecting an offset position from a center of the respective track being recorded in the recording area, the head being configured to read data recorded on the disk as the disk is being rotated, the driver being configured to drive the head in a radial direction of the disk, the controlling method comprising:

generating a first timing signal indicating a timing for reading the position signals from the read data;

demodulating a position of the head based on the position signals read in accordance with the generated first timing signal; and controlling the driver based on the demodulated position of the head, wherein, when the controller performs a seek operation for moving the head to a target track, the generating generates a second timing signal, a period of the second timing signal for reading the position signals being shorter than that of the first timing signal, a center time of the period of the second timing signal being shifted closer than that of the first timing signal to a demodulation center time corresponding to a center of the recording area, and wherein, the second timing signal is a signal obtained by bringing close one of a rising timing and a falling timing of the first timing signal to other one of the rising timing and the falling timing for each of the position signals, the other one of the rising timing and the falling timing being closer than the one of the rising timing and the falling timing to the demodulation center time.

16. The controlling method of claim 15, further comprising:

calculating a moving velocity of the head in the radial direction, wherein the generating comprises generating the second timing signal when the calculated moving velocity is greater than a preset first reference velocity, and generating the first timing signal when the calculated moving velocity is less than or equal to the first reference velocity.

17. The controlling method of claim 15, wherein the generating comprises generating the second timing signal when a distance between the target track and the position of the head when the seek operation is started is larger than a preset first threshold value, and generating the first timing signal when the distance is less than or equal to the first threshold value.

18. The controlling method of claim 15, wherein the position signals recorded in the recording area represent a four phase pattern or a two phase pattern.

\* \* \* \* \*